(12) United States Patent
Ishii et al.

(10) Patent No.: US 12,334,979 B2
(45) Date of Patent: Jun. 17, 2025

(54) OPTICAL WAVELENGTH MULTIPLEXING TRANSMISSION DEVICE AND OPTICAL WAVELENGTH MULTIPLEXING TRANSMISSION METHOD

(71) Applicant: Fujitsu Limited, Kawasaki (JP)

(72) Inventors: Shigeru Ishii, Ota (JP); Tatsuya Tsuzuki, Kawasaki (JP); Takehiro Fujita, Setagaya (JP); Tomoaki Takeyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 17/979,811

(22) Filed: Nov. 3, 2022

(65) Prior Publication Data

US 2023/0239050 A1    Jul. 27, 2023

(30) Foreign Application Priority Data

Jan. 26, 2022  (JP) .................................. 2022-010154

(51) Int. Cl.
*H04J 14/00*    (2006.01)
*H04B 10/079*   (2013.01)
(Continued)

(52) U.S. Cl.
CPC ... *H04B 10/2507* (2013.01); *H04B 10/07955* (2013.01); *H04J 14/0307* (2023.08)

(58) Field of Classification Search
CPC ........ H04B 10/07955; H04B 10/07957; H04B 10/2507; H04B 10/2942; H04B 10/296;
(Continued)

(56) References Cited

U.S. PATENT DOCUMENTS

| 7,194,210 B2* | 3/2007 | Uda ..................... H04B 10/294 398/160 |
| 7,359,112 B2* | 4/2008 | Nishihara ........... H01S 3/13013 359/341.41 |

(Continued)

FOREIGN PATENT DOCUMENTS

| JP | 2009-017451 A | 1/2009 |
| JP | 2018-133725 A | 8/2018 |

(Continued)

OTHER PUBLICATIONS

Hiroki et al., Cancellation of Static and Dynamic Power Transitions induced by inter-band Stimulated Raman Scattering in C+L-band WDM Transmission, IEEE, 3 pages, 2020.*

*Primary Examiner* — Frank Duong
(74) *Attorney, Agent, or Firm* — Fujitsu Intellectual Property Center

(57) ABSTRACT

An optical wavelength multiplexing transmission device includes: a demultiplexer configured to demultiplex a wavelength multiplexing signal for each wavelength band from a multiplexed signal that includes wavelength multiplexing signals in a plurality of the wavelength bands; a processor configured to detect an optical power value of each wavelength multiplexing signal for each wavelength band; calculate a compensation amount used to compensate a tilt of the wavelength multiplexing signal, by using the optical power value and a predetermined calculation expression; and compensate the tilt of the wavelength multiplexing signal, based on the compensation amount; and a multiplexer configured to multiplex each wavelength multiplexing signal compensated by the processor and output the wavelength multiplexing signal to a transmission line.

8 Claims, 16 Drawing Sheets

(51) Int. Cl.
*H04B 10/2507* (2013.01)
*H04J 14/02* (2006.01)

(58) Field of Classification Search
CPC  H04B 2210/258; H04J 3/0652; H04J 3/1694; H04J 3/247; H04J 14/0221; H04J 14/02216; H04J 14/02219; H04J 14/0307; H04N 21/2365; H04N 21/23655; H04N 21/2368; H04N 21/42615; H04N 21/434; H04N 21/4341; H04N 21/4342; H04N 21/4344
See application file for complete search history.

(56) References Cited

U.S. PATENT DOCUMENTS

| | | | |
|---|---|---|---|
| 10,541,749 B2 * | 1/2020 | Ishii | H04J 14/0221 |
| 11,750,292 B2 * | 9/2023 | Wang | H04B 10/07955 |
| | | | 398/160 |
| 2009/0016727 A1 | 1/2009 | Ueki et al. | |
| 2018/0234184 A1 | 8/2018 | Tanimura et al. | |
| 2019/0312641 A1 | 10/2019 | Ishii et al. | |
| 2020/0313790 A1 * | 10/2020 | Inada | H04B 10/2537 |

FOREIGN PATENT DOCUMENTS

| | | |
|---|---|---|
| JP | 2019-016986 A | 1/2019 |
| JP | 2019-186735 A | 10/2019 |

\* cited by examiner

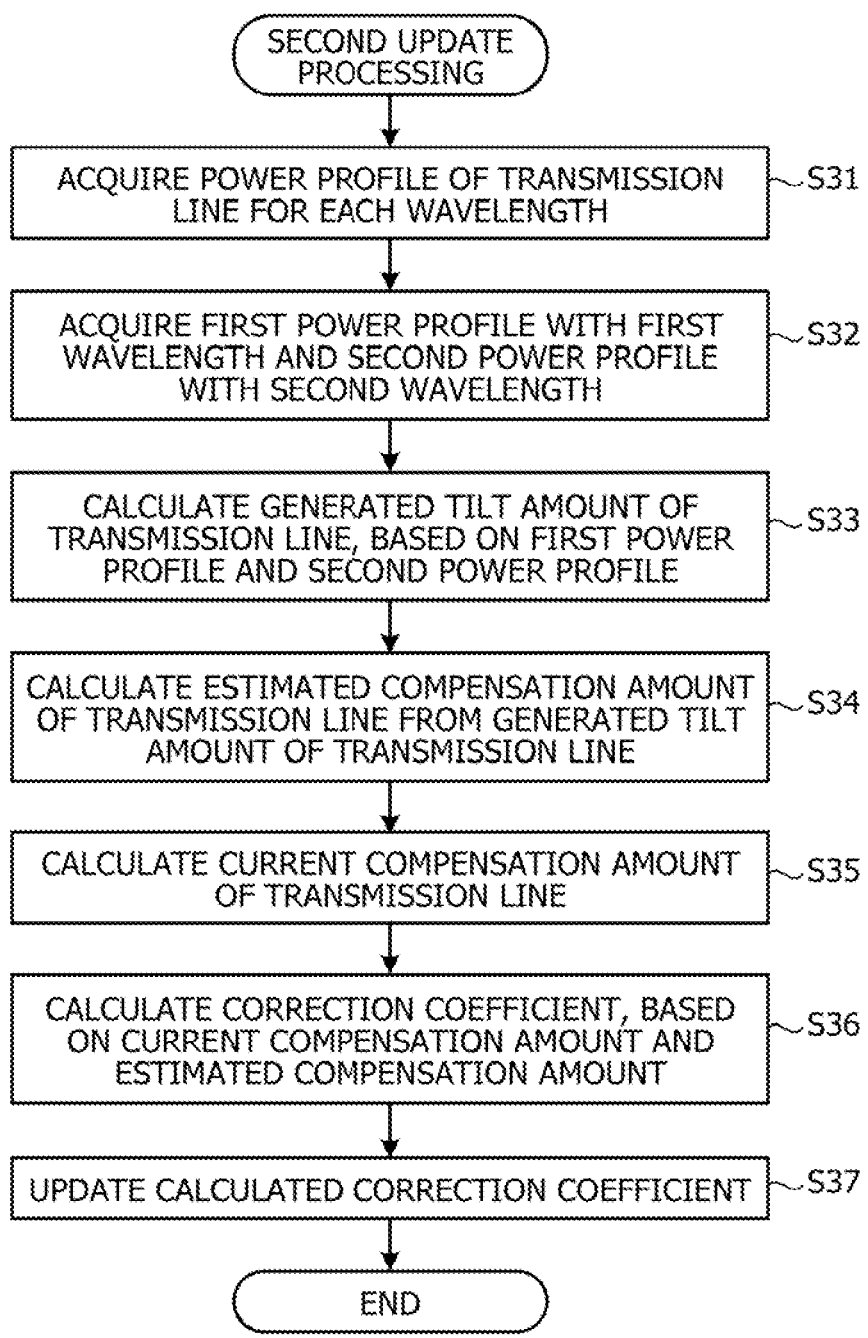

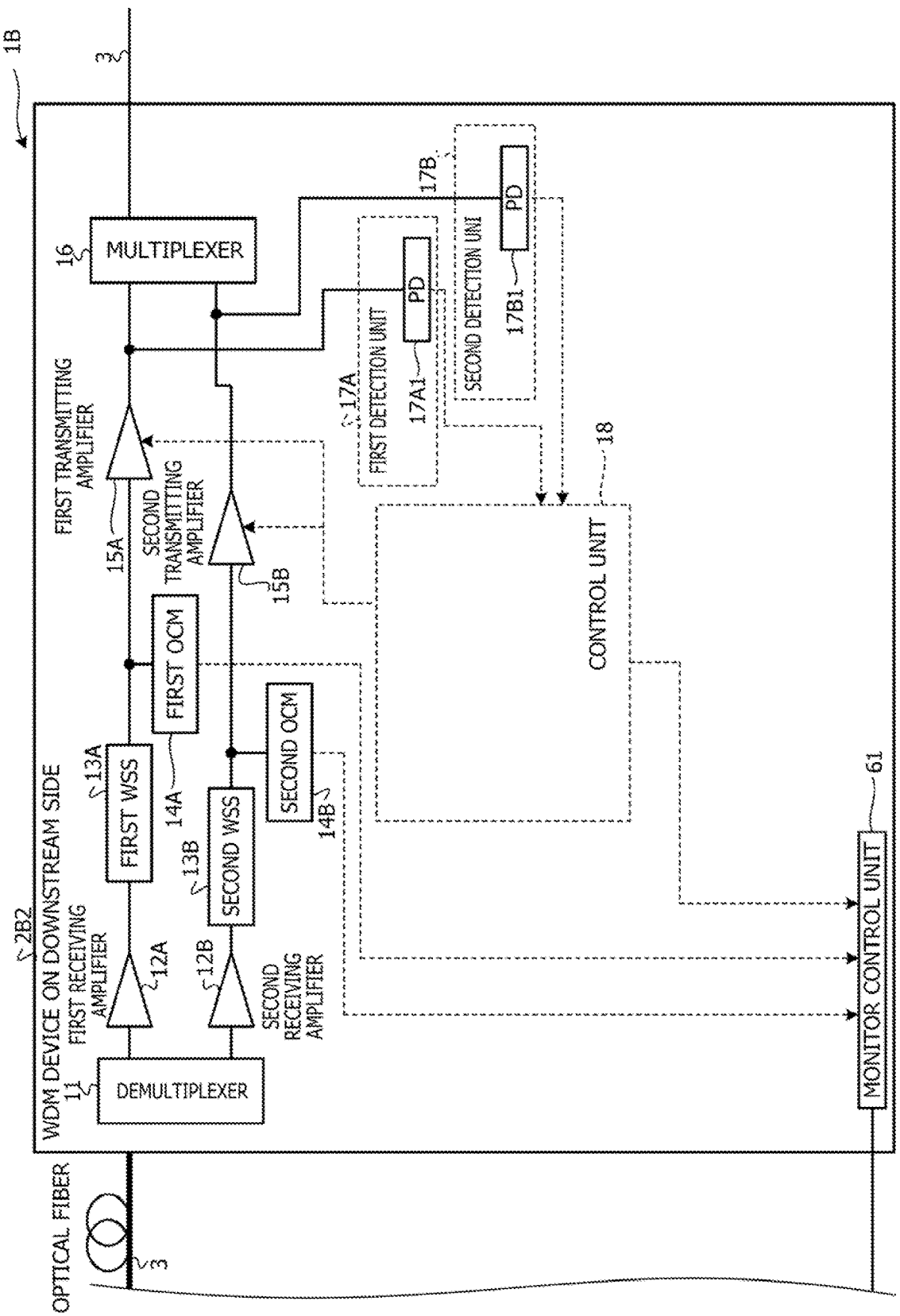

OPTICAL WAVELENGTH MULTIPLEXING TRANSMISSION DEVICE AND OPTICAL WAVELENGTH MULTIPLEXING TRANSMISSION METHOD

CROSS-REFERENCE TO RELATED APPLICATION

This application is based upon and claims the benefit of priority of the prior Japanese Patent Application No. 2022-10154, filed on Jan. 26, 2022, the entire contents of which are incorporated herein by reference.

FIELD

The embodiments discussed herein are related to an optical wavelength multiplexing transmission device and an optical wavelength multiplexing transmission method.

BACKGROUND

In recent years, for example, an optical wavelength division multiplexing (WDM) transmission method for multiplexing and transmitting optical signals with a plurality of wavelengths has been known for high-speed and large-capacity communication. Moreover, a multiband system using a plurality of optical wavelength bands, for example, a conventional band (C band), a long band (L band), or the like in order to expand a transmission capacity has been known. The C band is, for example, an optical wavelength band of 1530 nm to 1565 nm. The L band is, for example, an optical wavelength band with a long wavelength of 1565 nm to 1625 nm. In the WDM transmission method, for example, a large power deviation (tilt) is generated between a short wavelength side and a long wavelength side during optical fiber transmission, due to effects of a wavelength dependent loss (WDL), a stimulated Raman scattering (SRS), or the like. As a result, for example, decrease in optical power of an optical signal on the short wavelength side deteriorates signal quality on the reception side. Therefore, in order to suppress the deterioration in the signal quality on the reception side, tilt compensation is required.

Japanese Laid-open Patent Publication No. 2009-17451, Japanese Laid-open Patent Publication No. 2019-16986, and Japanese Laid-open Patent Publication No. 2019-186735 are disclosed as related art.

SUMMARY

According to an aspect of the embodiments, an optical wavelength multiplexing transmission device includes: a demultiplexer configured to demultiplex a wavelength multiplexing signal for each wavelength band from a multiplexed signal that includes wavelength multiplexing signals in a plurality of the wavelength bands; a processor configured to detect an optical power value of each wavelength multiplexing signal for each wavelength band; calculate a compensation amount used to compensate a tilt of the wavelength multiplexing signal, by using the optical power value and a predetermined calculation expression; and compensate the tilt of the wavelength multiplexing signal, based on the compensation amount; and a multiplexer configured to multiplex each wavelength multiplexing signal compensated by the processor and output the wavelength multiplexing signal to a transmission line. The processor is further configured to: acquire transmission line characteristics that indicates an optical power value in each wavelength band for each transmission distance of the transmission line; calculate a generated tilt amount of the transmission line, based on the transmission line characteristics; calculate an estimated compensation amount used to compensate the tilt of the wavelength multiplexing signal, by using the generated tilt amount of the transmission line and the predetermined calculation expression; calculate a correction coefficient used to correct the predetermined calculation expression, based on the estimated compensation amount and a current compensation amount; and update the correction coefficient.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart illustrating an example of a processing operation of a correction coefficient calculation unit in a WDM device relating to second update processing;

FIGS. 11A and 11B are an explanatory diagram illustrating an example of a WDM system according to a third embodiment;

DESCRIPTION OF EMBODIMENTS

Figure 1A:
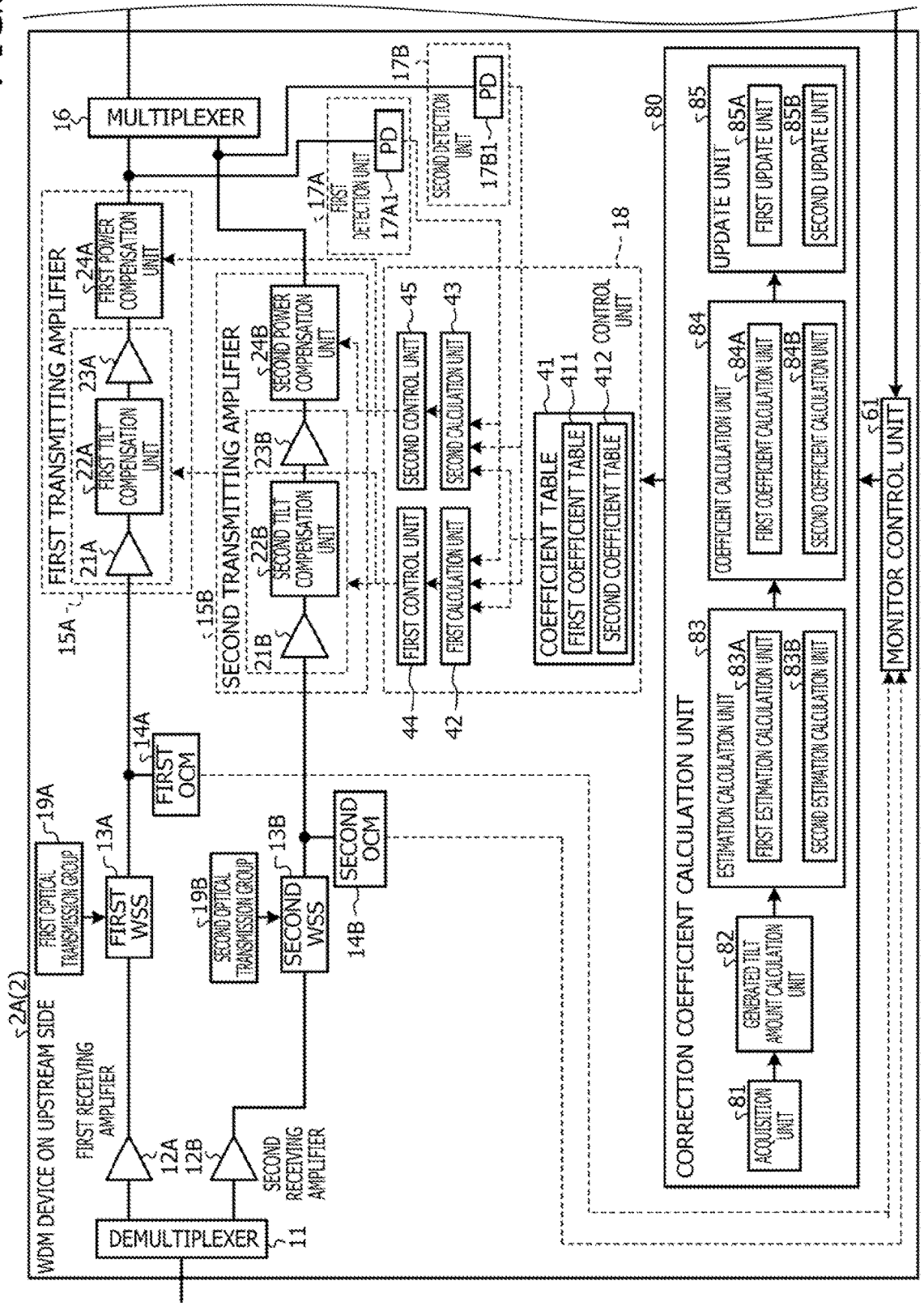
FIGS. 1A and 1B are an explanatory diagram illustrating an example of a WDM system according to a first embodiment.

However, in the multiband system, as an optical wavelength band to be used expands, tilts generated on the shortest wavelength side and the longest wavelength side of an optical signal to be transmitted are larger as compared with a single band system using only a single optical wavelength band. For example, because a tilt due to the WDL depends on characteristics of an optical fiber on a transmission line and does not depend on the number of wavelengths that fluctuates during operation, a tilt amount can be relatively easily estimated and compensated. On the other hand, because a tilt due to the SRS depends on the number of wavelengths that fluctuates during operation, tilt compensation according to the number of wavelengths is needed.

Therefore, according to a tilt compensation technology for a multiband system, a method has been known for monitoring a spectrum of a signal wavelength by a WDM device on a reception side, feed backing the monitoring result to a WDM device on a transmission side, and compensating a tilt by the WDM device on the transmission side based on the monitoring result. In this method, the tilt generated in the transmission line between the WDM device on the reception side and the WDM device on the transmission side can be naturally compensated, and tilt compensation with high accuracy according to the number of wavelengths that changes during operation can be achieved.

However, since the WDM device on the transmission side acquires the monitoring result from the WDM device on the reception side, it takes time to perform tilt compensation. For example, a case can be assumed where tilt compensation is not performed on time and a signal error is caused due to deterioration in signal quality on the reception side in a case where the number of wavelengths suddenly changes due to disconnection of an optical fiber, a device failure, or the like.

Furthermore, as a method for achieving high-speed tilt compensation, there is a method for monitoring input power of a WDM signal to be input to a transmitting amplifier in the WDM device and compensating a tilt in the WDM signal based on the input power. However, although this method can cope with tilt compensation in the WDM signal in the same optical wavelength band, it is not possible to compensate an SRS tilt generated between WDM signals in different optical wavelength bands of the multiband system with this method. Therefore, the applicant has proposed a WDM device that can compensate an SRS tilt at high speed and with high accuracy in a multiband system.

The WDM device includes a demultiplexer, a detection unit, a first compensation unit, a second compensation unit, and a multiplexer. The demultiplexer demultiplexes an optical wavelength multiplexing signal for each optical wavelength band from a multiplexed signal including optical wavelength multiplexing signals in a plurality of optical wavelength bands. The detection unit detects a power value of each optical wavelength multiplexing signal for each optical wavelength band. The first compensation unit compensates a tilt in the optical wavelength multiplexing signal for each optical wavelength band, based on the power value for each optical wavelength band. The second compensation unit compensates power of the optical wavelength multiplexing signal for each optical wavelength band so as to reduce a power difference between the tilt-compensated optical wavelength multiplexing signals, based on the power value for each optical wavelength band. The multiplexer multiplexes the power-compensated optical wavelength multiplexing signal and outputs a multiplexed signal. As a result, the SRS tilt can be compensated at high speed and with high accuracy in the multiband system.

However, a tilt compensation amount of the SRS tilt under high-speed tilt control is calculated using a value designed in advance with respect to a presupposed transmission line condition (fiber type, loss coefficient, for example, lamp loss that is loss of connection portion for connecting optical transmission device and optical fiber). Therefore, a control error of tilt compensation amount increases depending on the transmission line condition (size of connector loss or loss coefficient).

For example, when power on the short wavelength side is increased too much and a nonlinear effect increases, signal quality is deteriorated. Furthermore, when power on the long wavelength side is lowered too much and an optical signal to noise ratio (OSNR) deteriorates, the signal quality is deteriorated. For example, in C band and L band transmissions to be a mainstream in the future, a band of signal light expands, and the number of wavelengths increases. As a result, an SRS tilt generation amount increases, and therefore, an effect of the control error of the tilt compensation amount increases.

Therefore, in order to perform control with a tilt compensation amount optimized for each transmission line to be actually used, it is needed to determine a tilt compensation amount suitable for each transmission line at the time of system construction or system operation. However, in the current situation, it is difficult to directly determine a tilt compensation amount for high-speed SRS tilt compensation.

Furthermore, it is possible to transmit a plurality of wavelengths with an optical fiber and observe a power deviation with respect to the transmitted wavelength with a spectrum analyzer or the like. However, since this power deviation includes an effect of the WDL in addition to the SRS, it is needed to devise a way of removing other effects in order to observe only the SRS.

In one aspect, an object is to provide an optical wavelength multiplexing transmission device or the like that can compensate an SRS tilt at high speed and with high accuracy in a multiband system.

Hereinafter, embodiments of an optical wavelength multiplexing transmission device and an optical wavelength multiplexing transmission method disclosed in the present application will be described in detail with reference to the drawings. Note that the disclosed technology is not limited to each of the embodiments. Furthermore, each embodiment to be described below may be appropriately combined, without causing inconsistency.

First Embodiment

Figure 1B:
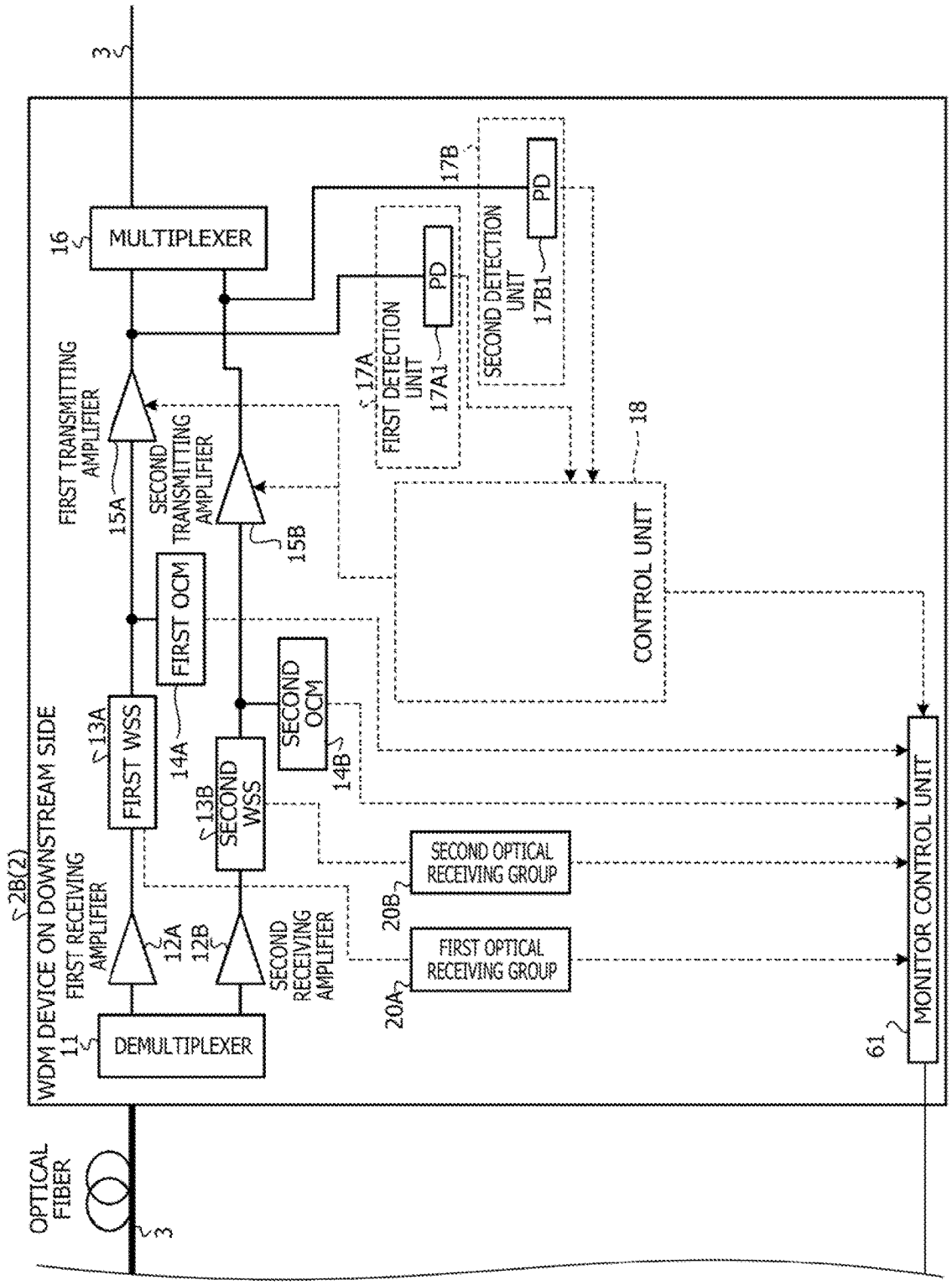

FIGS. 1A and 1B are an explanatory diagram illustrating an example of a WDM system according to a first embodiment. A WDM system 1 according to the first embodiment includes a plurality of WDM devices 2 and connects between the WDM devices 2 with an optical fiber 3 that is a transmission line. The WDM system 1 is a multiband system that divides and multiplexes optical signals in a plurality of optical wavelength bands. The WDM system 1 is a system that multiplexes a WDM signal in a first optical wavelength band, for example, a C band and a second WDM signal in a second optical wavelength band, for example, an L band. Each WDM device 2 outputs a WDM signal obtained by multiplexing a first WDM signal in the C band and the second WDM signal in the L band to the optical fiber 3 and causes the first WDM signal in the C band and the second WDM signal in the L band to be separable from a WDM signal received from the optical fiber 3. The WDM system 1 illustrated in FIGS. 1A and 1B includes, for example, a WDM device 2A on the upstream side and a WDM device 2B on the downstream side.

The WDM device 2 illustrated in FIGS. 1A and 1B includes a demultiplexer 11, a first receiving amplifier 12A, a second receiving amplifier 12B, a first wavelength selective switch (WSS) 13A, and a second WSS 13B. The WDM device 2 includes a first optical channel monitor (OCM) 14A, a second OCM 14B, a first transmitting amplifier 15A, a second transmitting amplifier 15B, a multiplexer 16, a first detection unit 17A, a second detection unit 17B, and a control unit 18. Moreover, the WDM device 2 includes a first optical transmission group 19A, a second optical transmission group 19B, a monitor control unit 61, and a correction coefficient calculation unit 80.

The demultiplexer 11 demultiplexes the WDM signal into the first WDM signal in the C band and the second WDM signal in the L band, outputs the first WDM signal to the first receiving amplifier 12A, and outputs the second WDM signal to the second receiving amplifier 12B.

The first receiving amplifier 12A is an optical amplifier that optically amplifies the first WDM signal and outputs the optically amplified first WDM signal to the first WSS 13A. The first WSS 13A is a wavelength selection switch that optically inserts an optical signal from the first optical transmission group 19A into the first WDM signal. The first WSS 13A outputs the optically inserted first WDM signal to the first transmitting amplifier 15A. The first transmitting amplifier 15A is an optical amplifier that tilt-compensates the first WDM signal and power-compensates the first WDM signal that is tilt-compensated. Then, the first transmitting amplifier 15A outputs the tilt-compensated and power-compensated first WDM signal to the multiplexer 16.

The second receiving amplifier 12B is an optical amplifier that optically amplifies the second WDM signal and outputs the optically amplified second WDM signal to the second WSS 13B. The second WSS 13B is a wavelength selection switch that optically inserts an optical signal from the second optical transmission group 19B into the second WDM signal. The second WSS 13B outputs the optically inserted second WDM signal to the second transmitting amplifier 15B. The second transmitting amplifier 15B is an optical amplifier that tilt-compensates the second WDM signal and power-compensates the second WDM signal that is tilt-compensated. Then, the second transmitting amplifier 15B outputs the tilt-compensated and power-compensated second WDM signal to the multiplexer 16.

The multiplexer 16 multiplexes the first WDM signal from the first transmitting amplifier 15A and the second WDM signal from the second transmitting amplifier 15B and outputs the WDM signal to the optical fiber 3 that is connected with an optical connector (not illustrated). The first detection unit 17A is a detection unit that detects a first power value that is output power of the first WDM signal from the WDM signal that is transmitted between the multiplexer 16 and the optical fiber 3 and is output from the multiplexer 16 and notifies the control unit 18 of the first power value. The second detection unit 17B is a detection unit that detects a second power value that is output power of the second WDM signal from the WDM signal that is transmitted between the multiplexer 16 and the optical fiber 3 and is output from the multiplexer 16 and notifies the control unit 18 of the second power value.

The first transmitting amplifier 15A includes a first preamplifier 21A, a first tilt compensation unit 22A, a first postamplifier 23A, and a first power compensation unit 24A. The first preamplifier 21A and the first postamplifier 23A are, for example, erbium doped fiber amplifiers (EDFA) or the like.

The first preamplifier 21A optically amplifies the first WDM signal from the first WSS 13A and outputs the optically amplified first WDM signal to the first tilt compensation unit 22A. The first tilt compensation unit 22A is a first compensation unit such as a variable attenuator that performs tilt-compensation in a direction in which a tilt amount in the first WDM signal is reduced. Note that the first tilt compensation unit 22A can change a gain deviation with respect to a wavelength by about one dB, for example, by increasing ±one dB. The first tilt compensation unit 22A outputs the tilt-compensated first WDM signal to the first postamplifier 23A. The first postamplifier 23A amplifies the tilt-compensated first WDM signal and outputs the amplified first WDM signal to the first power compensation unit 24A. The first power compensation unit 24A is a second compensation unit such as a variable attenuator that power-compensates the tilt-compensated first WDM signal. The first power compensation unit 24A power-compensates the entire first WDM signal so as to reduce a power difference between the first WDM signal and the second WDM signal. The first power compensation unit 24A outputs the power-compensated first WDM signal to the multiplexer 16.

The second transmitting amplifier 15B includes a second preamplifier 21B, a second tilt compensation unit 22B, a second postamplifier 23B, and a second power compensation unit 24B. The second preamplifier 21B and the second postamplifier 23B are, for example, erbium doped fiber amplifiers (EDFA) or the like.

The second preamplifier 21B optically amplifies the second WDM signal from the second WSS 13B and outputs the optically amplified second WDM signal to the second tilt compensation unit 22B. The second tilt compensation unit 22B is a first compensation unit such as a variable attenuator that performs tilt-compensation in a direction in which a tilt amount in the second WDM signal is reduced. Note that the second tilt compensation unit 22B can change a gain deviation with respect to a wavelength by about one dB, for example, by increasing ±one dB. The second tilt compensation unit 22B outputs the tilt-compensated second WDM signal to the second postamplifier 23B. The second postamplifier 23B amplifies the tilt-compensated second WDM signal and outputs the amplified second WDM signal to the second power compensation unit 24B. The second power compensation unit 24B is a second compensation unit such as a variable attenuator that power-compensates the tilt-compensated second WDM signal. The second power compensation unit 24B power-compensates the entire second WDM signal so as to reduce the power difference between the first WDM signal and the second WDM signal. The second power compensation unit 24B outputs the power-compensated second WDM signal to the multiplexer 16.

The first detection unit 17A includes a photo diode (PD) 17A1. The PD 17A1 in the first detection unit 17A extracts the first WDM signal from the WDM signal output by the multiplexer 16, electrically converts output power of the extracted first WDM signal to the optical fiber 3, and detects the first power value. Then, the first detection unit 17A outputs the detected first power value to a first calculation unit 42 and a second calculation unit 43 to be described later.

The second detection unit 17B includes a PD 17B1. The PD 17B1 in the second detection unit 17B extracts the second WDM signal from the WDM signal output by the multiplexer 16, electrically converts output power of the extracted second WDM signal to the optical fiber 3, and detects the second power value. Then, the second detection unit 17B outputs the detected second power value to the first calculation unit 42 and the second calculation unit 43 to be described later.

The first OCM 14A is a monitoring unit that monitors optical power for each wavelength in the first WDM signal from the first WSS 13A and notifies the first WSS 13A of the monitoring result. The first WSS 13A controls the optical power for each wavelength so that a power deviation for each wavelength in the first WDM signal is within a predetermined range, based on the monitoring result from the first OCM 14A. Note that the predetermined range is, for example, a range of a power deviation that does not affect tilt compensation. As a result, because the first WSS 13A inputs the power-controlled first WDM signal to the first transmitting amplifier 15A, accuracy of the tilt compensation of the first WDM signal performed by the first transmitting amplifier 15A increases.

The second OCM 14B is a monitoring unit that monitors optical power for each wavelength in the second WDM signal from the second WSS 13B and notifies the second WSS 13B of the monitoring result. The second WSS 13B controls the optical power for each wavelength so that a power deviation for each wavelength in the second WDM signal is within the predetermined range, based on the monitoring result from the second OCM 14B. As a result, because the second WSS 13B inputs the power-controlled second WDM signal to the second transmitting amplifier 15B, accuracy of the tilt compensation of the second WDM signal performed by the second transmitting amplifier 15B increases.

The control unit 18 includes a coefficient table 41, the first calculation unit 42, the second calculation unit 43, a first control unit 44, and a second control unit 45. The first calculation unit 42 calculates a first tilt compensation amount to be set to the first tilt compensation unit 22A using a first calculation expression A1 and calculates a second tilt compensation amount to be set to the second tilt compensation unit 22B using a first calculation expression A2. The first control unit 44 controls the first tilt compensation unit 22A based on the first tilt compensation amount and controls the second tilt compensation unit 22B based on the second tilt compensation amount.

The second calculation unit 43 calculates a first power compensation amount to be set to the first power compensation unit 24A using a second calculation expression B1 and calculates a second power compensation amount to be set to the second power compensation unit 24B using a second calculation expression B2. The second control unit 45 controls the first power compensation unit 24A based on the first power compensation amount and controls the second power compensation unit 24B based on the second power compensation amount.

Figure 2:
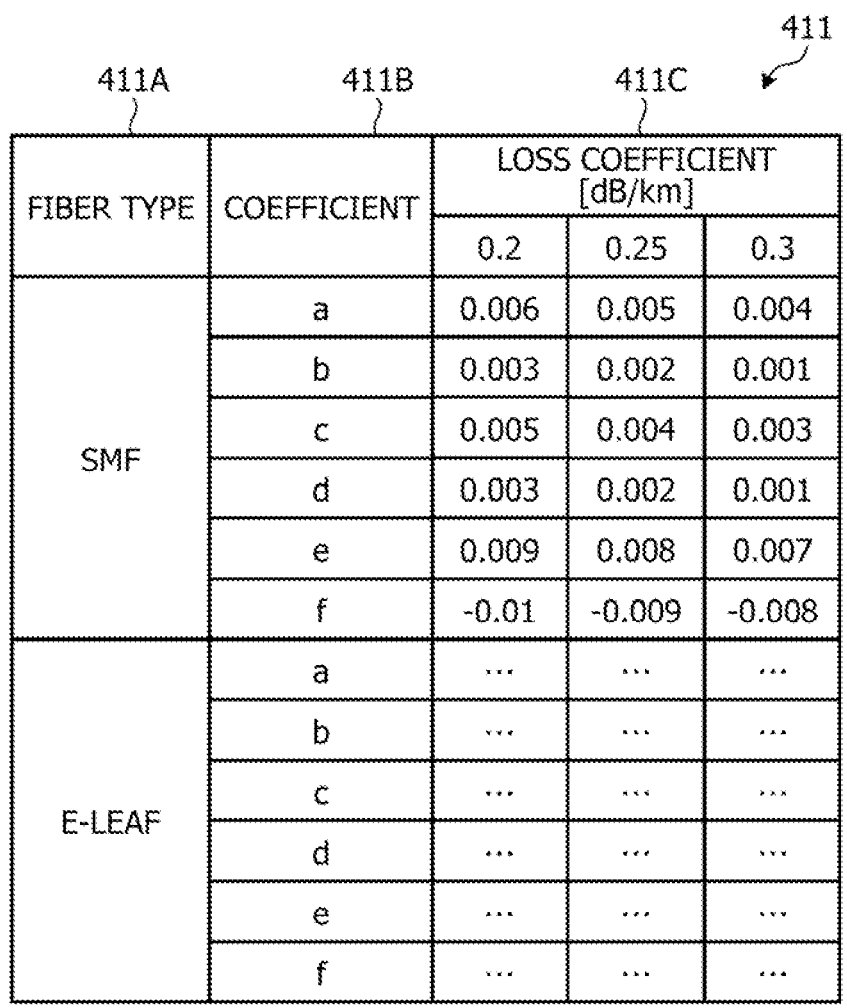
FIG. 2 is an explanatory diagram illustrating an example of a table configuration of a first coefficient table.

The coefficient table 41 includes a first coefficient table 411 and a second coefficient table 412. FIG. 2 is an explanatory diagram illustrating an example of a table configuration of the first coefficient table 411. The first coefficient table 411 illustrated in FIG. 2 manages a coefficient 411B and a loss coefficient 411C in association with each fiber type 411A of the optical fiber 3. The first calculation unit 42 acquires the coefficient 411B and the loss coefficient 411C corresponding to the fiber type 411A of the optical fiber 3 from the first coefficient table 411. The first calculation unit 42 calculates the first tilt compensation amount based on the acquired coefficient 411B and loss coefficient 411C, the first power value and the second power value, and the first calculation expression A1. The first tilt compensation amount is a compensation amount used to compensate an SRS tilt in the first WDM signal in the C band. The first calculation unit 42 calculates the second tilt compensation amount based on the acquired coefficient 411B and loss coefficient 411C, the first power value and the second power value, and the first calculation expression A2. The second tilt compensation amount is a compensation amount used to compensate an SRS tilt in the second WDM signal in the L band.

The second calculation unit 43 acquires the coefficient 411B and the loss coefficient 411C corresponding to the fiber type 411A of the optical fiber 3 from the first coefficient table 411. The second calculation unit 43 calculates the first power compensation amount based on the acquired coefficient 411B and loss coefficient 411C, the first power value and the second power value, and the second calculation expression B1. The first power compensation amount is a compensation amount used to compensate a total optical power difference between the optical wavelength bands generated due to the SRS, that is calculated with the second power value of the second WDM signal and the loss coefficient. The second calculation unit 43 calculates the second power compensation amount based on the acquired coefficient 411B and loss coefficient 411C, the first power value and the second power value, and the second calculation expression B1. The second power compensation amount is a compensation amount used to compensate a total optical power difference between the optical wavelength bands generated due to the SRS, that is calculated with the first power value of the first WDM signal and the loss coefficient.

The first control unit 44 controls the first tilt compensation unit 22A so as to reduce the tilt amount in the first WDM signal, based on the first tilt compensation amount. The first control unit 44 controls the second tilt compensation unit 22B so as to reduce the tilt amount in the second WDM signal, based on the second tilt compensation amount.

The second control unit 45 controls the first power compensation unit 24A so as to reduce the power difference between the first WDM signal and the second WDM signal, based on the first power compensation amount. The second control unit 45 controls the second power compensation unit 24B so as to reduce the power difference between the first WDM signal and the second WDM signal, based on the second power compensation amount. As a result, at the time of multiband transmission, the WDM device 2 on the opposite side connected with the optical fiber 3 can control the power deviation for each wavelength of the plurality of optical wavelength bands to be within a predetermined range.

The first calculation unit 42 refers to the coefficient table 41 and calculates the first tilt compensation amount using the first calculation expression A1 of (first power value×coefficient a)+(second power value×coefficient b)×K. Furthermore, the first calculation unit 42 calculates the second tilt compensation amount using the first calculation expression A2 of (second power value×coefficient c)+(first power value×coefficient d)×L. Note that the coefficients a, b, c, and d are loss coefficients for each fiber type set in advance at the time of system construction. The references K and L represents first correction coefficients.

The second calculation unit 43 calculates the first power compensation amount using the second calculation expression B1 of (second power value×coefficient e)×M. The second calculation unit 43 calculates the second power compensation amount using the second calculation expression B2 of (first power value×coefficient f)×N. Note that the coefficients e and f are loss coefficients for each fiber type set in advance at the time of system construction. The references M and N represent second correction coefficients.

Figure 3:
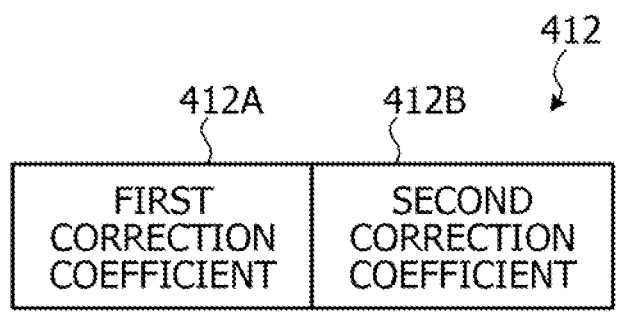
FIG. 3 is an explanatory diagram illustrating an example of a table configuration of a second coefficient table.

FIG. 3 is an explanatory diagram illustrating an example of a table configuration of the second coefficient table 412. The second coefficient table 412 is a table that manages the first correction coefficient K used to correct the first calculation expression A1, the first correction coefficient L used to correct the first calculation expression A2, the second correction coefficient M used to correct the second calculation expression B1, and the second correction coefficient N used to correct the second calculation expression B2.

The correction coefficient calculation unit 80 includes an acquisition unit 81, a generated tilt amount calculation unit 82, an estimation calculation unit 83, a coefficient calculation unit 84, and an update unit 85. The acquisition unit 81 acquires a power profile that is transmission line characteristics in a transmission line longitudinal direction indicating an optical power value (attenuation amount) in each wavelength band for each transmission distance of the transmission line from the WDM device 2B on the downstream side via the monitor control unit 61. Note that although the WDM device 2B on the downstream side has the substantially same configuration as the WDM device 2A on the upstream side, the WDM device 2B on the downstream side includes a first optical receiving group 20A that connects to the first WSS 13A in the WDM device 2B on the downstream side and a second optical receiving group 20B that connects to the second WSS 13B in the WDM device 2B on the downstream side. The first optical receiving group 20A receives the first WDM signal that is wavelength-selected by the first WSS 13A. The second optical receiving group 20B receives the second WDM signal that is wavelength-selected by the second WSS 13B. The first optical receiving group 20A acquires the power profile from the received first WDM signal and notifies the monitor control unit 61 in the WDM device 2B on the downstream side of the acquired power profile. Moreover, the second optical receiving group 20B acquires the power profile from the received second WDM signal and notifies the monitor control unit 61 in the WDM device 2B on the downstream side of the acquired power profile. Then, the monitor control unit 61 in the WDM device 2B on the downstream side notifies the WDM device 2A on the upstream side of the power profiles received from the first receiving group and the second receiving group.

Figure 4:
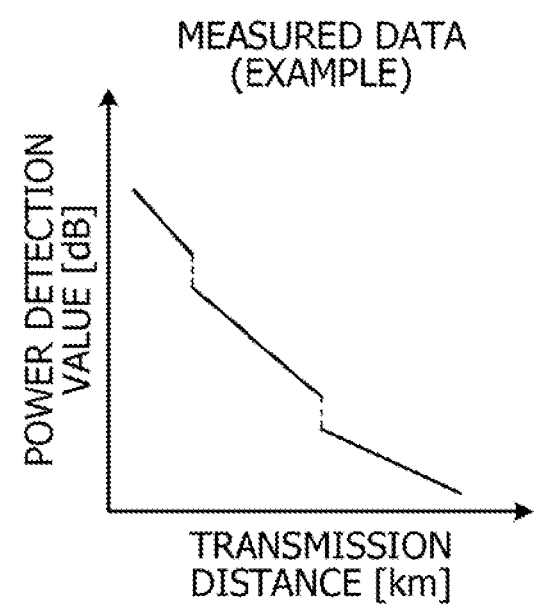
FIG. 4 is an explanatory diagram illustrating an example of a power profile that is a relationship between a transmission distance and a power detection value according to the first embodiment.

FIG. 4 is an explanatory diagram illustrating an example of the power profile that is a relationship between the transmission distance and the power detection value according to the first embodiment. The acquisition unit 81 acquires the power profile that indicates an optical power value for each transmission distance in any wavelength band among a plurality of wavelength bands for each transmission distance of the transmission line from the WDM device 2B on the downstream side via the monitor control unit 61, at the time of system construction or stable system operation. Note that as a technique for acquiring a power profile, for example, the technique in Japanese Laid-open Patent Publication No. 2018-133725 is used that can measure a power profile without affecting a main signal during system operation. Furthermore, an optical time domain reflectometer (OTDR) may be used, and can be appropriately changed.

The generated tilt amount calculation unit 82 calculates a generated tilt amount of the transmission line, based on the power profile. The generated tilt amount calculation unit 82 calculates a generated tilt amount for each transmission distance from the power profile of any wavelength band and calculates a generated tilt amount of the transmission line from the generated tilt amount for each transmission distance. The generated tilt amount calculation unit 82 calculates the generated tilt amount for each transmission distance by substituting the power profile in (formula 1). Note that SRSCoeff_fibertype is a generated tilt amount in infinite length for each optical fiber type (for example, generated tilt amount generated in a case of operation with maximum wavelength number of system) and is held in a memory in advance. FiberLossCoeff_base is a loss coefficient that is used when SRSCoeff_fibertype is calculated. FiberLossCoeff_actual is a loss coefficient of a transmission line that is actually used and is calculated from the measured power profile.

$$FiberSRS = \sum \left[ SRSCoeff_{Fibertype} \times \left( \frac{FiberLossCoeff_{base}}{FiberLossCoeff_{actual}} \right) \times \left[ 1 - 10^{-\left(\frac{FiberLoss}{10}\right)} \right] \times FiberInput \right]$$ [Expression 1]

The estimation calculation unit 83 calculates an estimated compensation amount used to compensate a tilt of a wavelength multiplexing signal, using the generated tilt amount of the transmission line calculated by the generated tilt amount calculation unit 82 and a predetermined calculation expression. The estimation calculation unit 83 includes a first estimation calculation unit 83A and a second estimation calculation unit 83B. The first estimation calculation unit 83A calculates a first tilt estimated compensation amount used to compensate a tilt in a wavelength multiplexing signal, using the generated tilt amount of the transmission line calculated by the generated tilt amount calculation unit 82 and the first calculation expression A1. The first estimation calculation unit 83A calculates a second tilt estimated compensation amount used to compensate the tilt in the wavelength multiplexing signal, using the generated tilt amount of the transmission line calculated by the generated tilt amount calculation unit 82 and the first calculation expression A2. The second estimation calculation unit 83B calculates a first power estimated compensation amount used to compensate power for each wavelength band, using the generated tilt amount of the transmission line calculated by the generated tilt amount calculation unit 82 and the second calculation expression B1. The second estimation calculation unit 83B calculates a second power estimated compensation amount used to compensate power for each wavelength band, using the generated tilt amount of the transmission line calculated by the generated tilt amount calculation unit 82 and the second calculation expression B2.

The coefficient calculation unit 84 includes a first coefficient calculation unit 84A and a second coefficient calculation unit 84B. The first coefficient calculation unit 84A calculates the first correction coefficient K used to correct the first calculation expression A1, based on the first tilt estimated compensation amount calculated by the first estimation calculation unit 83A and a current first tilt compensation amount calculated by the first calculation unit 42. Note that the current first tilt compensation amount is an actual tilt compensation amount to be flat using the first calculation expression A1. The first coefficient calculation unit 84A calculates the first correction coefficient L used to correct the first calculation expression A2, based on the second tilt estimated compensation amount calculated by the first estimation calculation unit 83A and a current second tilt compensation amount calculated by the first calculation unit 42. Note that the current second tilt compensation amount is an actual tilt compensation amount to be flat using the first calculation expression A2.

The second coefficient calculation unit 84B calculates the second correction coefficient M used to correct the second calculation expression B1, based on the first power estimated compensation amount calculated by the second estimation calculation unit 83B and a current first power compensation amount calculated by the second calculation unit 43. Note that the current first power compensation amount is an actual power compensation amount with no deviation, using the second calculation expression B1. The second coefficient calculation unit 84B calculates the second correction coefficient N used to correct the second calculation expression B2, based on the second power estimated compensation amount calculated by the second estimation calculation unit 83B and a current second power compensation amount calculated by the second calculation unit 43. Note that the current second power compensation amount is an actual power compensation amount with no deviation, using the second calculation expression B2.

The update unit 85 update the correction coefficient calculated by the coefficient calculation unit 84. The update unit 85 includes a first update unit 85A and a second update unit 85B. The first update unit 85A updates a first correction coefficient 412A in the second coefficient table 412 using the first correction coefficients K and L calculated by the first coefficient calculation unit 84A. The second update unit 85B updates a second correction coefficient 412B in the second coefficient table 412 using the second correction coefficients M and N calculated by the second coefficient calculation unit 84B.

For example, in a case where the number of wavelengths fluctuates due to a failure such as disconnection of an optical fiber, the first calculation unit 42 calculates the current first tilt compensation amount using the first correction coefficient K stored in the second coefficient table 412 and the first calculation expression A1. Then, the first control unit 44 controls the first tilt compensation unit 22A so as to reduce the tilt amount in the first WDM signal, based on the first tilt compensation amount. In a case where the number of wavelengths fluctuates, the first calculation unit 42 calculates the current second tilt compensation amount using the first correction coefficient L stored in the second coefficient table 412 and the first calculation expression A2. Then, the first control unit 44 controls the second tilt compensation unit 22B so as to reduce the tilt amount in the second WDM signal, based on the second tilt compensation amount.

In a case where the number of wavelengths fluctuates, the second calculation unit 43 calculates the current first power compensation amount using the second correction coefficient M stored in the second coefficient table 412 and the second calculation expression B1. Then, the second control unit 45 controls the first power compensation unit 24A so as to reduce the power difference between the first WDM signal and the second WDM signal, based on the first power compensation amount. In a case where the number of wavelengths fluctuates, the second calculation unit 43 calculates the current second power compensation amount using the second correction coefficient N stored in the second coefficient table 412 and the second calculation expression B2. Then, the second control unit 45 controls the second power compensation unit 24B so as to reduce the power difference between the first WDM signal and the second WDM signal, based on the second power compensation amount.

The monitor control unit 61 communicates with another WDM device 2 using an optical supervisory channel (OSC).

The first OCM 14A in the WDM device 2A on the upstream side monitors the optical power for each wavelength in the first WDM signal from the first WSS 13A on the upstream side and notifies the monitor control unit 61 of the monitoring result. Moreover, the second OCM 14B in the WDM device 2A on the upstream side monitors the optical power for each wavelength in the second WDM signal from the second WSS 13B on the upstream side and notifies the monitor control unit 61 of the monitoring result.

The first OCM 14A in the WDM device 2B on the downstream side monitors the optical power for each wavelength in the first WDM signal from the first WSS 13A on the downstream side and notifies the monitor control unit 61 of the monitoring result. Moreover, the second OCM 14B in the WDM device 2B on the downstream side monitors the optical power for each wavelength in the second WDM signal from the second WSS 13B on the downstream side and notifies the monitor control unit 61 on the downstream side of the monitoring result. The monitor control unit 61 in the WDM device 2B on the downstream side notifies the monitor control unit 61 in the WDM device 2A on the upstream side of the optical power for each wavelength in the first WDM signal on the downstream side and the optical power for each wavelength in the second WDM signal on the downstream side.

Figure 5:
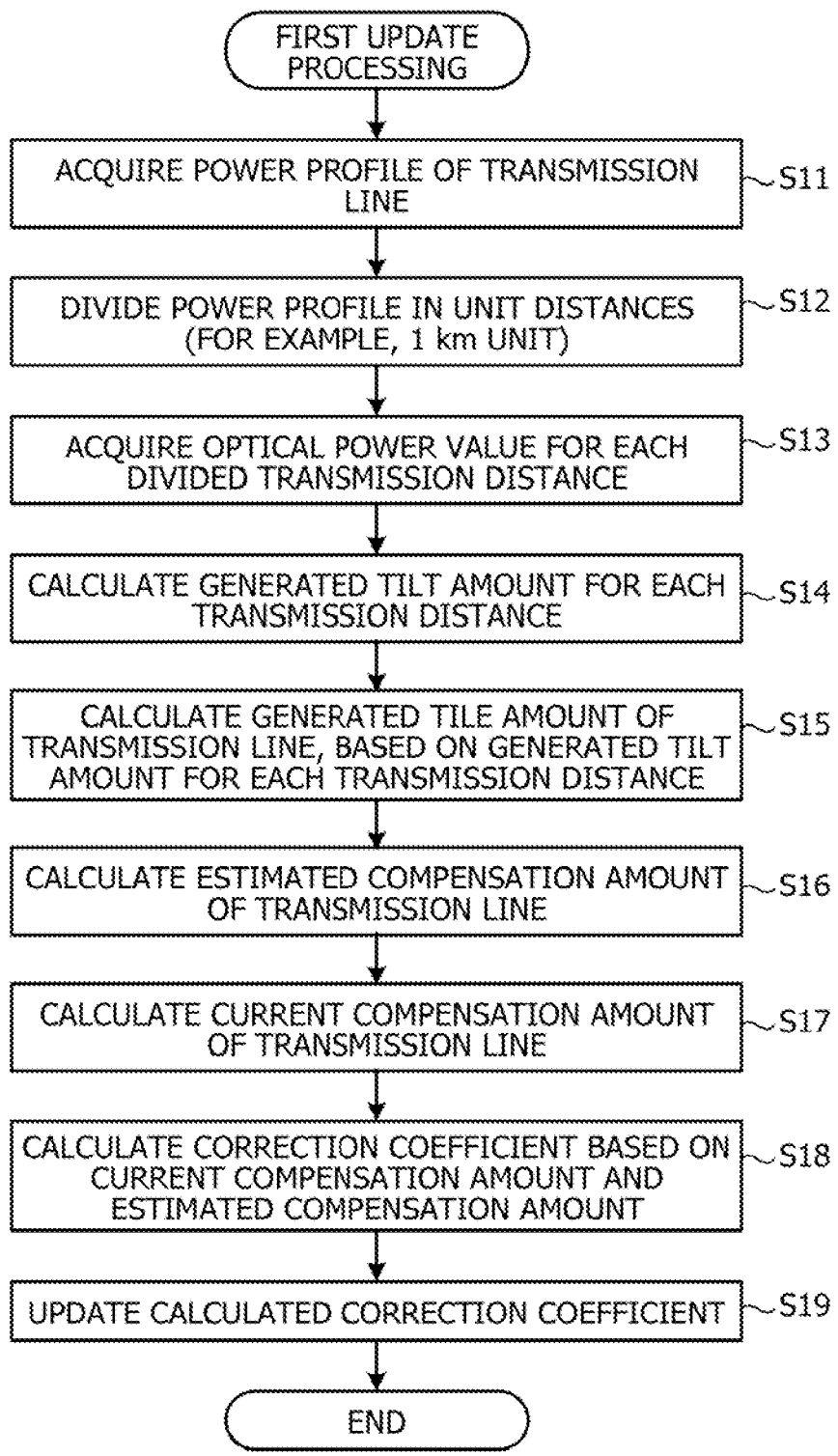
FIG. 5 is a flowchart illustrating an example of a processing operation of a correction coefficient calculation unit in a WDM device relating to first update processing.

Next, an operation of the WDM system 1 according to the first embodiment will be described. FIG. 5 is a flowchart illustrating an example of a processing operation of the correction coefficient calculation unit 80 in the WDM device 2 relating to first update processing. In FIG. 5, the acquisition unit 81 acquires a power profile of a transmission line (step S11). The acquisition unit 81 divides the acquired power profile of the transmission line in unit distances, for example, one km units (step S12).

The acquisition unit 81 acquires an optical power value for each divided transmission distance (step S13). The generated tilt amount calculation unit 82 calculates a generated tilt amount for each transmission distance based on the acquired optical power value for each transmission distance (step S14). The generated tilt amount calculation unit 82 calculates a generated tilt amount of the transmission line based on the generated tilt amount for each transmission distance (step S15).

The estimation calculation unit 83 calculates an estimated compensation amount of the transmission line, based on the generated tilt amount of the transmission line (step S16). Note that the estimated compensation amount is, for example, the first tilt estimated compensation amount, the second tilt estimated compensation amount, the first power estimated compensation amount, and the second power estimated compensation amount. For example, the first estimation calculation unit 83A calculates the first tilt estimated compensation amount used to compensate a tilt in the first WDM signal, using the generated tilt amount of the transmission line calculated by the generated tilt amount calculation unit 82 and the first calculation expression A1. The first estimation calculation unit 83A calculates the second tilt estimated compensation amount used to compensate a tilt in the second WDM signal, using the generated tilt amount of the transmission line calculated by the generated tilt amount calculation unit 82 and the first calculation expression A2. The second estimation calculation unit 83B calculates the first power estimated compensation amount, using the generated tilt amount of the transmission line calculated by the generated tilt amount calculation unit 82 and the second calculation expression B1. The second estimation calculation unit 83B calculates the second power estimated compensation amount, using the generated tilt amount of the transmission line calculated by the generated tilt amount calculation unit 82 and the second calculation expression B2.

The control unit 18 calculates a current compensation amount of the transmission line (step S17). For example, the current compensation amount is, for example, the first tilt compensation amount, the second tilt compensation amount, the first power compensation amount, and the second power compensation amount. The first calculation unit 42 calculates the first tilt compensation amount used to compensate the tilt in the first WDM signal, using the optical power value and the first calculation expression A1. The first calculation unit 42 calculates the second tilt compensation amount used to compensate the tilt in the second WDM signal, using the optical power value and the first calculation expression A2. The second calculation unit 43 calculates the first power compensation amount, using the optical power value and the second calculation expression B1. The second calculation unit 43 calculates the second power compensation amount, using the optical power value and the second calculation expression B2.

The coefficient calculation unit 84 calculates a correction coefficient based on the current compensation amount and the estimated compensation amount (step S18). For example, the first coefficient calculation unit 84A calculates the first correction coefficient K used to correct the first calculation expression A1, based on the first tilt estimated compensation amount calculated by the first estimation calculation unit 83A and the current first tilt compensation amount calculated by the first calculation unit 42. The first coefficient calculation unit 84A calculates the first correction coefficient L used to correct the first calculation expression A2, based on the second tilt estimated compensation amount calculated by the first estimation calculation unit 83A and a current second tilt compensation amount calculated by the first calculation unit 42. The second coefficient calculation unit 84B calculates the second correction coefficient M used to correct the second calculation expression B1, based on the first power estimated compensation amount calculated by the second estimation calculation unit 83B and a current first power compensation amount calculated by the second calculation unit 43. The second coefficient calculation unit 84B calculates the second correction coefficient N used to correct the second calculation expression B2, based on the second power estimated compensation amount calculated by the second estimation calculation unit 83B and a current second power compensation amount calculated by the second calculation unit 43.

The update unit 85 updates the calculated correction coefficient in the second coefficient table 412 (step S19) and ends the processing operation illustrated in FIG. 5. For example, the first update unit 85A updates the first correction coefficient in the second coefficient table 412 with the first correction coefficients K and L calculated by the first coefficient calculation unit 84A. The second update unit 85B updates the second correction coefficient in the second coefficient table 412 with the second correction coefficients M and N calculated by the second coefficient calculation unit 84B.

Figure 6:
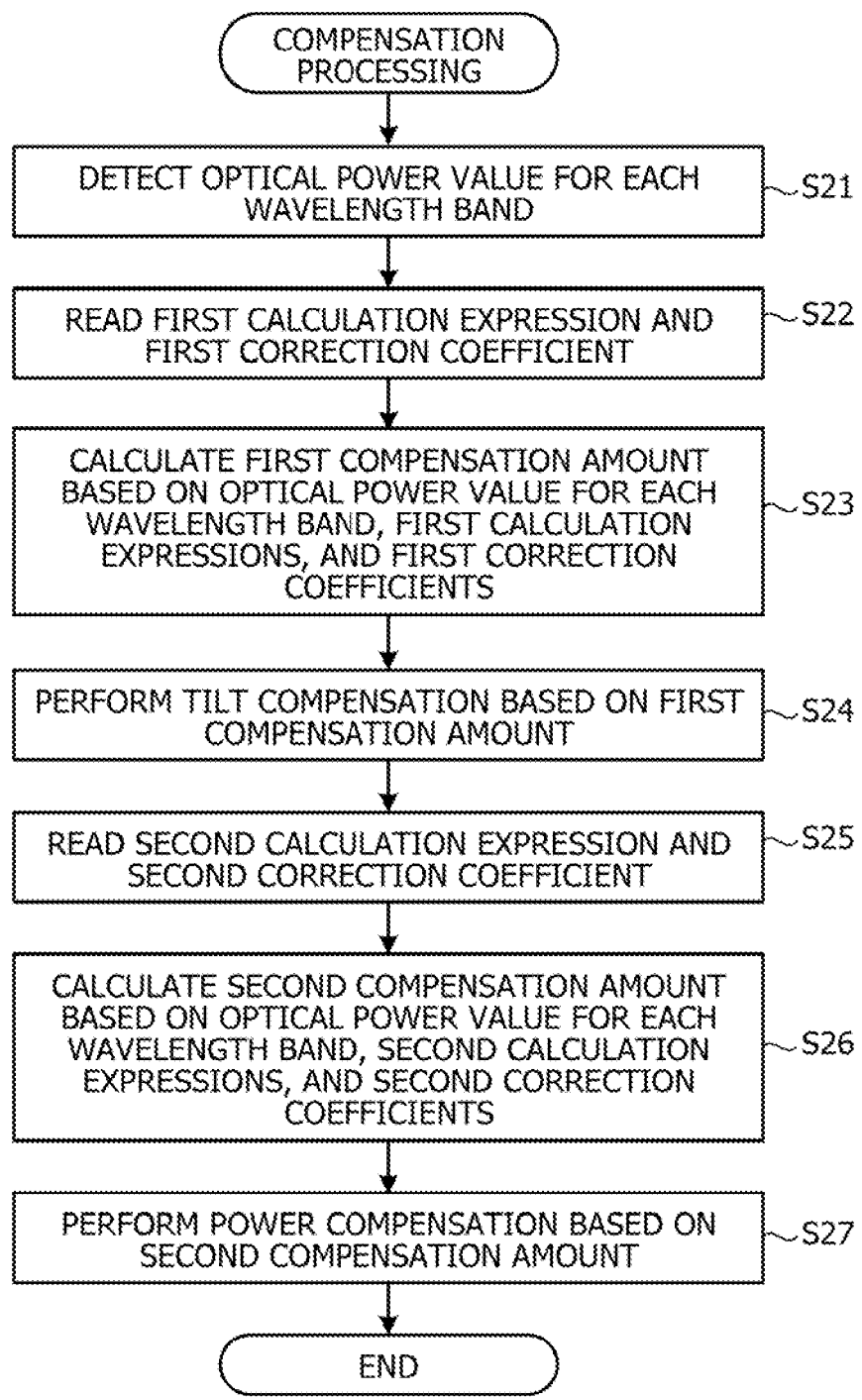
FIG. 6 is a flowchart illustrating an example of a processing operation of a control unit in the WDM device relating to compensation processing.

FIG. 6 is a flowchart illustrating an example of a processing operation of the control unit 18 in the WDM device 2 relating to compensation processing. The control unit 18 in FIG. 6 detects an optical power value for each wavelength band (step S21). The first calculation unit 42 reads the first calculation expressions A1 and A2 and the first correction coefficients K and L from the coefficient table 41 (step S22).

The first calculation unit 42 calculates a first compensation amount, based on the optical power value for each wavelength band, the first calculation expressions, and the first correction coefficients (step S23). For example, the first compensation amount is the first tilt compensation amount and the second tilt compensation amount. The first calculation unit 42 calculates the first tilt compensation amount, based on the optical power value for each wavelength band, the first calculation expression A1, and the first correction coefficient K. The first calculation unit 42 calculates the second tilt compensation amount, based on the optical power value for each wavelength band, the first calculation expression A2, and the first correction coefficient L.

The first control unit 44 performs tilt compensation in a band, based on the calculated first compensation amount (step S24). For example, the first control unit 44 controls the first tilt compensation unit 22A that performs tilt compensation in the band, based on the calculated first tilt compensation amount. The first control unit 44 controls the second tilt compensation unit 22B that performs tilt compensation in the band, based on the calculated second tilt compensation amount. As a result, the first tilt compensation unit 22A tilt-compensates the first WDM signal so as to reduce the tilt amount in the first WDM signal. The second tilt compensation unit 22B tilt-compensates the second WDM signal so as to reduce the tilt amount in the second WDM signal.

The second calculation unit 43 reads the second calculation expressions B1 and B2 and the second correction coefficients M and N from the coefficient table 41 (step S25). The second calculation unit 43 calculates a second compensation amount, based on the optical power value for each wavelength band, the second calculation expressions, and the second correction coefficients (step S26). For example, the second compensation amount is the first power compensation amount and the second power compensation amount. The second calculation unit 43 calculates the first power compensation amount, based on the optical power value for each wavelength band, the second calculation expression B1, and the second correction coefficient M. The second calculation unit 43 calculates the second power compensation amount, based on the optical power value for each wavelength band, the second calculation expression B2, and the second correction coefficient N.

The second control unit 45 performs power compensation between bands, based on the calculated second compensation amount (step S27) and ends the processing operation illustrated in FIG. 6. For example, the second control unit 45 controls the first power compensation unit 24A that performs power compensation between the bands, based on the calculated first power compensation amount. The second control unit 45 controls the second power compensation unit 24B that performs power compensation between the bands, based on the calculated second power compensation amount. As a result, the first power compensation unit 24A compensates output power of the tilt-compensated first WDM signal so as to reduce the power difference between the tilt-compensated first WDM signal and second WDM signal. The second power compensation unit 24B compensates output power of the tilt-compensated second WDM signal so as to reduce the power difference between the tilt-compensated first WDM signal and second WDM signal.

The WDM device 2 according to the first embodiment acquires the power profile that is the transmission line characteristics indicating the optical power value in each wavelength band for each transmission distance of the transmission line and calculates a generated tilt amount of the transmission line based on the power profile. The WDM device 2 calculates an estimated compensation amount used to compensate a tilt of the WDM signal, using the calculated generated tilt amount of the transmission line and a predetermined calculation expression. The WDM device 2 calculates a correction coefficient used to correct the predetermined calculation expression based on the calculated estimated compensation amount and the current compensation amount and updates the calculated correction coefficient. As a result, because the predetermined calculation expression is corrected using the correction coefficient calculated based on the estimated compensation amount calculated from the generated tilt amount and the current compensation amount, a control error of the compensation amount can be reduced. Then, even in a case where the number of wavelengths fluctuates during operation in the multiband system, SRS tilt compensation for each optical wavelength band can be achieved at high speed and with high accuracy.

The first estimation calculation unit 83A calculates the first tilt estimated compensation amount used to compensate the tilt in the first WDM signal, using the calculated generated tilt amount of the transmission line and the first calculation expression A1. Furthermore, the first estimation calculation unit 83A calculates the second tilt estimated compensation amount used to compensate the tilt in the second WDM signal, using the calculated generated tilt amount of the transmission line and the first calculation expression A2. The first coefficient calculation unit 84A calculates the first correction coefficient K used to correct the first calculation expression A1, based on the calculated first tilt estimated compensation amount and the current first tilt compensation amount. Furthermore, the first coefficient calculation unit 84A calculates the first correction coefficient L used to correct the first calculation expression A2, based on the calculated second tilt estimated compensation amount and the current second tilt compensation amount. The first update unit 85A updates the calculated first correction coefficients K and L. As a result, because the first calculation expressions A1 and A2 are corrected with the first correction coefficients K and L calculated based on the tilt estimated compensation amounts calculated from the generated tilt amount and the current tilt compensation amounts, a control error of the tilt compensation amount can be reduced.

The second estimation calculation unit 83B calculates the first power estimated compensation amount used to compensate the power for each wavelength band, using the calculated generated tilt amount of the transmission line and the second calculation expression B1. Furthermore, the second estimation calculation unit 83B calculates the second power estimated compensation amount used to compensate the power for each wavelength band, using the calculated generated tilt amount of the transmission line and the second calculation expression B2. The second coefficient calculation unit 84B calculates the second correction coefficient M used to correct the second calculation expression B1, based on the calculated first power estimated compensation amount and the current first power compensation amount. Furthermore, the second coefficient calculation unit 84B calculates the second correction coefficient N used to correct the second calculation expression B2, based on the calculated second power estimated compensation amount and the current second power compensation amount. The second update unit 85B updates the calculated second correction coefficients M and N. As a result, because the second calculation expressions B1 and B2 are corrected with the second correction coefficients M and N calculated based on the power estimated compensation amounts calculated from the generated tilt amount and the current power compensation amounts, a control error of the power compensation amount can be reduced.

The acquisition unit 81 acquires the power profile indicating the optical power value for each transmission distance in any wavelength band, among the plurality of wavelength bands for each transmission distance of the transmission line. The generated tilt amount calculation unit 82 calculates a generated tilt amount for each transmission distance from the power profile of any wavelength band and calculates a generated tilt amount of the transmission line from the generated tilt amount for each transmission distance. As a result, for example, at the time of system construction or system operation, a compensation amount suitable for each transmission line can be determined using the power profile of any wavelength band.

A case has been described where the acquisition unit 81 in the WDM device 2 according to the first embodiment acquires the power profile indicating the optical power value for each transmission distance in any wavelength band, among the plurality of wavelength bands for each transmission distance of the transmission line. However, the acquisition unit 81 may acquire a first power profile indicating the optical power value for each transmission distance in the first wavelength band, among the plurality of wavelength bands for each transmission distance of the transmission line and may acquire a second power profile indicating the optical power value for each transmission distance in the second wavelength band. Therefore, the embodiment thereof will be described below as a second embodiment.

Second Embodiment

Figure 7A:
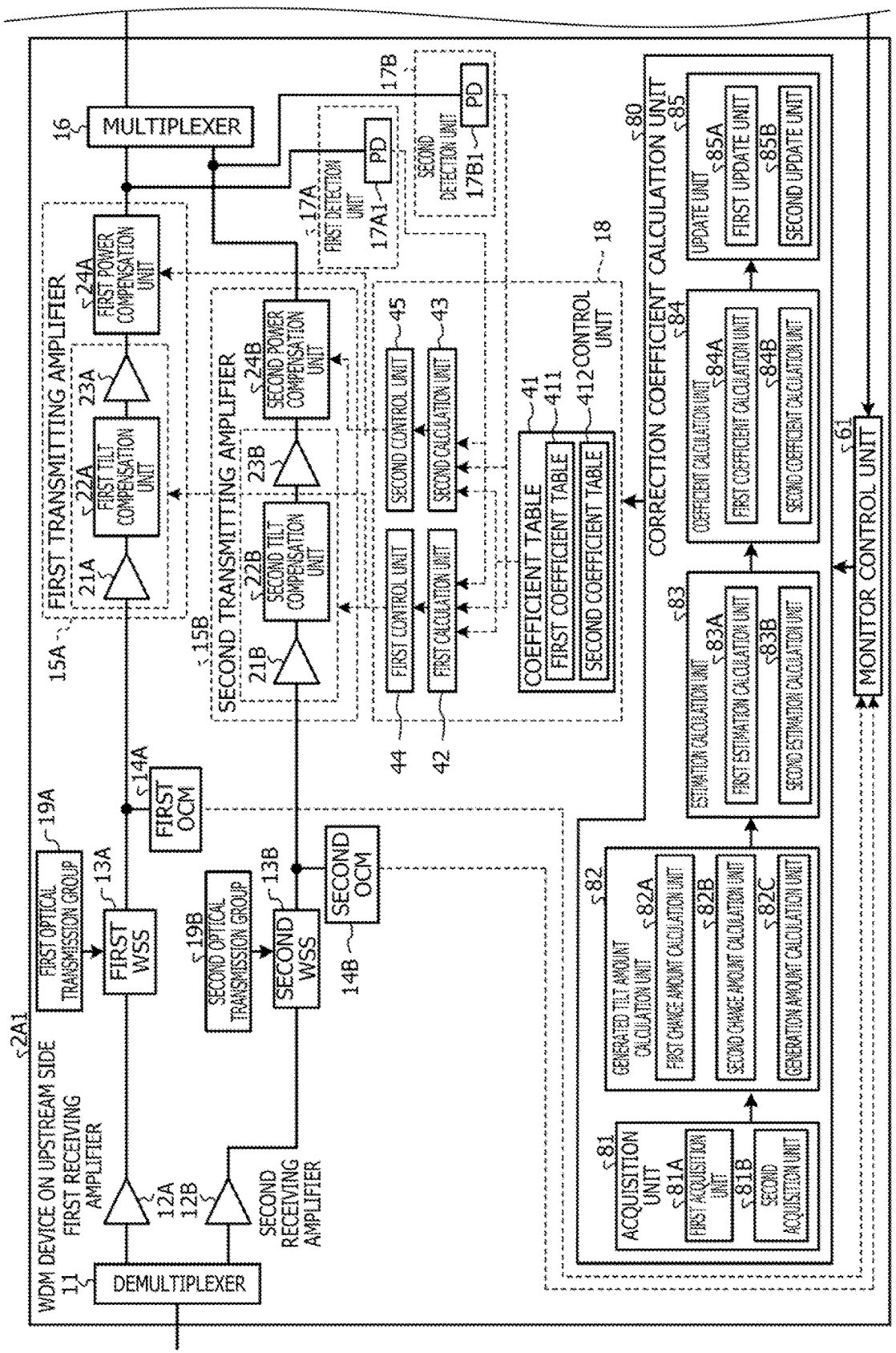
FIGS. 7A and 7B are an explanatory diagram illustrating an example of a WDM system according to a second embodiment.
Figure 7B:
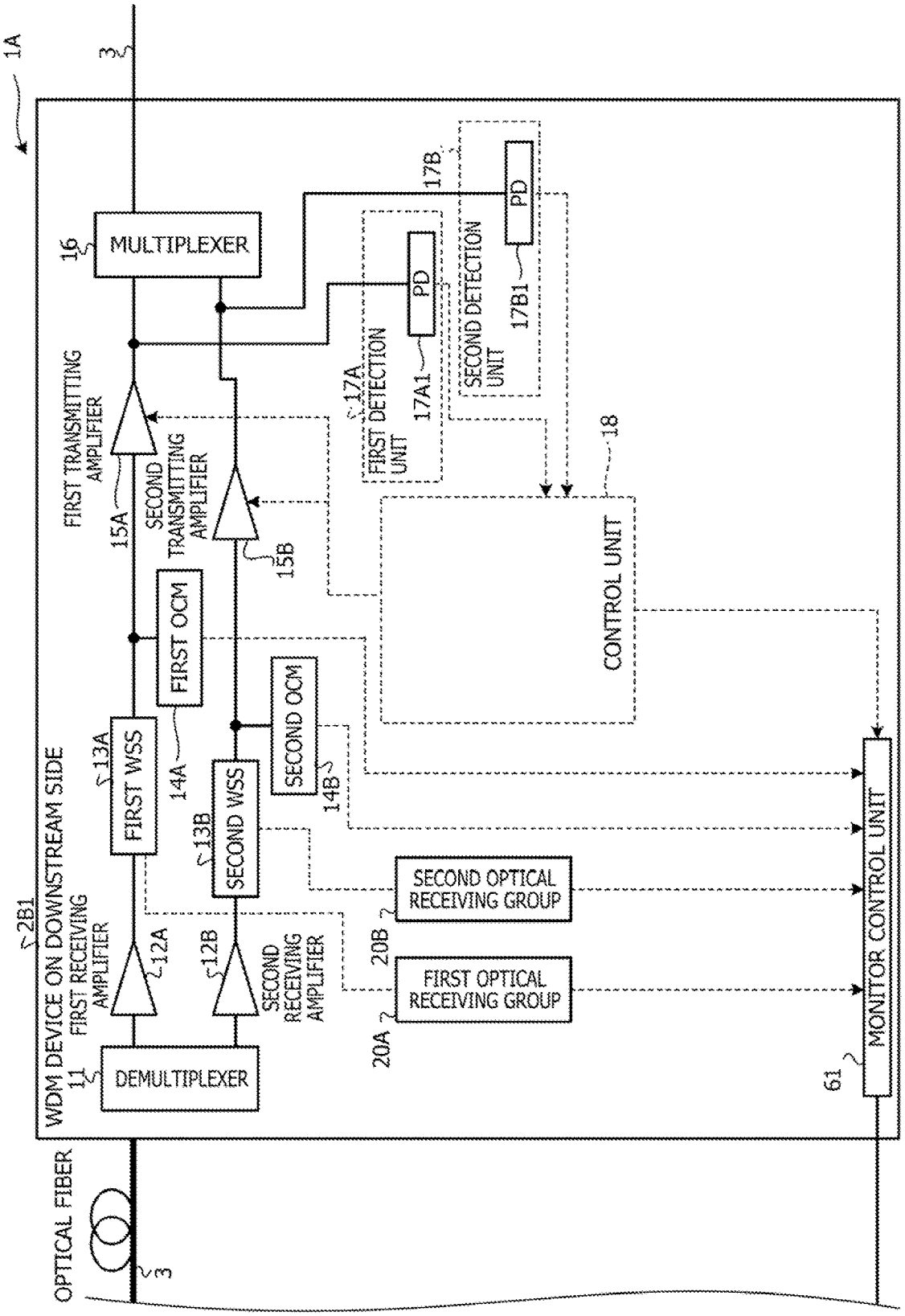

FIGS. 7A and 7B are an explanatory diagram illustrating an example of a WDM system 1A according to a second embodiment. Note that description of overlapping configurations and operations is omitted by providing the same reference numerals to the same configurations as those of the WDM system 1 illustrated in FIGS. 1A and 1B. A difference between the WDM device 2 illustrated in FIGS. 1A and 1B and a WDM device 2A1 illustrated in FIGS. 7A and 7B is a point that an acquisition unit 81 includes a first acquisition unit 81A and a second acquisition unit 81B. Moreover, a generated tilt amount calculation unit 82 includes a first change amount calculation unit 82A, a second change amount calculation unit 82B, a generation amount calculation unit 82C. Note that a WDM device 2B1 also has the substantially same configuration as the WDM device 2A1. The WDM device 2B1 includes a first optical receiving group 20A and a second optical receiving group 20B.

The acquisition unit 81 includes the first acquisition unit 81A and the second acquisition unit 81B. The first acquisition unit 81A acquires the first power profile indicating an optical power value for each transmission distance in a first wavelength band, for example, a short wavelength band, among a plurality of wavelength bands for each transmission distance of a transmission line at the time of system construction or stable system operation. The second acquisition unit 81B acquires the second power profile indicating an optical power value for each transmission distance in a second wavelength band, for example, a long wavelength band, among the plurality of wavelength bands for each transmission distance of the transmission line at the time of system construction or stable system operation.

The generated tilt amount calculation unit 82 includes the first change amount calculation unit 82A, the second change amount calculation unit 82B, the generation amount calculation unit 82C. The first change amount calculation unit 82A calculates a first power change amount of the transmission line from the first power profile acquired by the first acquisition unit 81A. The second change amount calculation unit 82B calculates a second power change amount of the transmission line from the second power profile acquired by the second acquisition unit 81B. The generation amount calculation unit 82C calculates a generated tilt amount of the transmission line, based on the first power change amount and the second power change amount.

Figure 8:
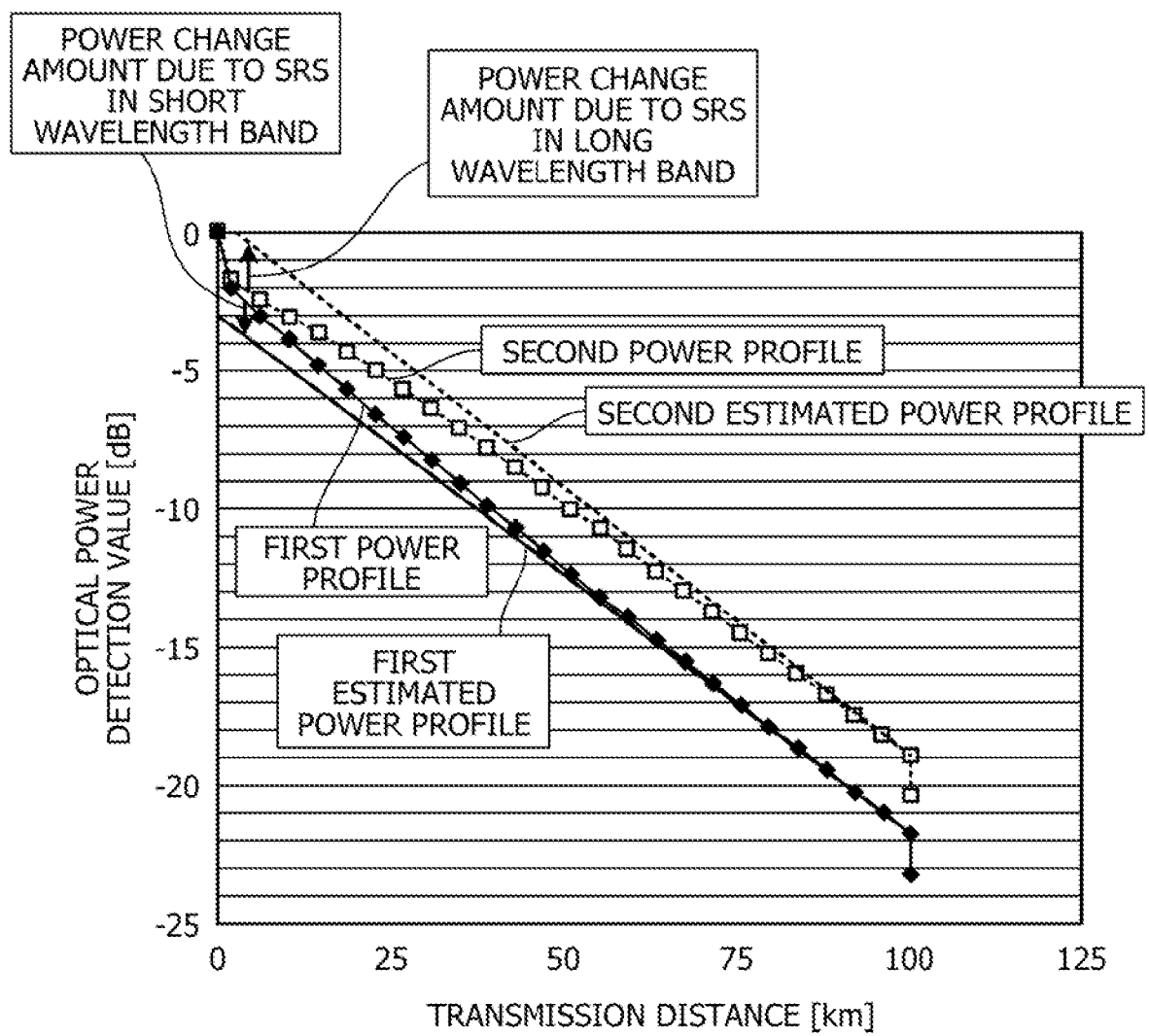
FIG. 8 is an explanatory diagram illustrating an example of a power profile that is a relationship between a transmission distance and a power detection value according to the second embodiment.

FIG. 8 is an explanatory diagram illustrating an example of a power profile that is a relationship between a transmission distance and a power detection value according to the second embodiment. As illustrated in FIG. 8, the first change amount calculation unit 82A calculates a first estimated power profile at a transmission line input end in a case of being extrapolated with an inclination near the transmission line input end of the first power profile in the short wavelength band. The first change amount calculation unit 82A calculates the first power change amount, which is a power change amount due to SRS in the short wavelength band and is a difference between the first power profile and the first estimated power profile. Note that the WDL is subtracted from the first power change amount.

As illustrated in FIG. 8, the second change amount calculation unit 82B calculates a second estimated power profile at the transmission line input end in a case of being extrapolated with an inclination near the transmission line input end of the second power profile in the long wavelength band. The second change amount calculation unit 82B calculates the second power change amount, which is a power change amount due to SRS in the long wavelength band and is a difference between the second power profile and the second estimated power profile. Note that the WDL is subtracted from the second power change amount.

Figure 9:
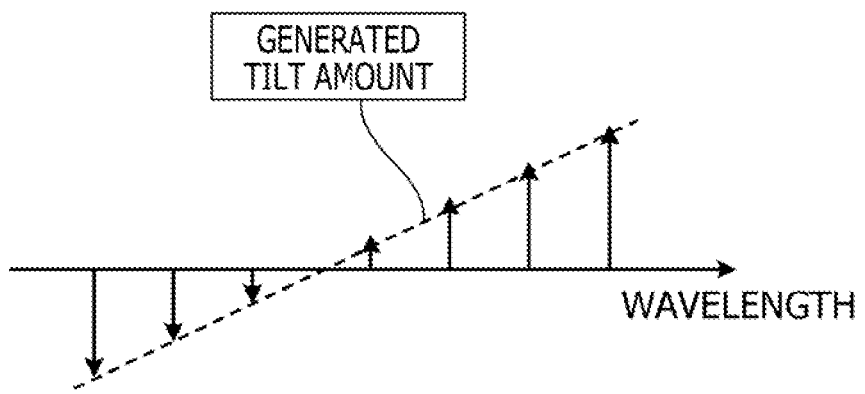
FIG. 9 is an explanatory diagram illustrating an example of a relationship between a wavelength and a generated tilt amount.

FIG. 9 is an explanatory diagram illustrating an example of a relationship between a wavelength and a generated tilt amount. The generation amount calculation unit 82C calculates a generated tilt amount of the transmission line by plotting the first power change amount due to the SRS in the short wavelength band and the second power change amount due to the SRS in the long wavelength band for each wavelength as illustrated in FIG. 9.

FIG. 10 is a flowchart illustrating an example of a processing operation of a correction coefficient calculation unit 80 in the WDM device 2A1 relating to second update processing. In FIG. 10, the acquisition unit 81 acquires a power profile of the transmission line for each wavelength (step S31). The acquisition unit 81 acquires the first power profile in the first wavelength band, for example, a short wavelength band through the first acquisition unit 81A and acquires the second power profile in the second wavelength band, for example, a long wavelength band through the second acquisition unit 81B (step S32).

The generated tilt amount calculation unit 82 calculates a generated tilt amount of the transmission line, based on the first power profile and the second power profile (step S33). For example, the first change amount calculation unit 82A calculates the first estimated power profile from the first power profile. The first change amount calculation unit 82A calculates the first power change amount due to the SRS in the short wavelength band, based on the difference between the first power profile and the first estimated power profile. The second change amount calculation unit 82B calculates the second estimated power profile from the second power profile. The second change amount calculation unit 82B calculates the second power change amount due to the SRS in the long wavelength band, based on the difference between the second power profile and the second estimated power profile. The generation amount calculation unit 82C calculates the generated tilt amount of the transmission line illustrated in FIG. 9, based on the first power change amount due to the SRS in the short wavelength band and the second power change amount due to the SRS in the long wavelength band.

An estimation calculation unit 83 calculates an estimated compensation amount of the transmission line, based on the generated tilt amount of the transmission line (step S34). Note that the estimated compensation amount is, for example, the first tilt estimated compensation amount, the second tilt estimated compensation amount, the first power estimated compensation amount, and the second power estimated compensation amount. For example, a first estimation calculation unit 83A calculates the first tilt estimated compensation amount used to compensate a tilt in the first WDM signal, using the generated tilt amount of the transmission line calculated by the generated tilt amount calculation unit 82 and a first calculation expression A1. The first estimation calculation unit 83A calculates the second tilt estimated compensation amount used to compensate a tilt in a second WDM signal, using the generated tilt amount of the transmission line calculated by the generated tilt amount calculation unit 82 and a first calculation expression A2. A second estimation calculation unit 83B calculates the first power estimated compensation amount, using the generated tilt amount of the transmission line calculated by the generated tilt amount calculation unit 82 and a second calculation expression B1. The second estimation calculation unit 83B calculates the second power estimated compensation amount, using the generated tilt amount of the transmission line calculated by the generated tilt amount calculation unit 82 and a second calculation expression B2.

A control unit 18 calculates a current compensation amount of the transmission line (step S35). For example, the current compensation amount is, for example, the first tilt compensation amount, the second tilt compensation amount, the first power compensation amount, and the second power compensation amount. The first calculation unit 42 calculates the first tilt compensation amount used to compensate the tilt in the first WDM signal, using the optical power value and the first calculation expression A1. The first calculation unit 42 calculates the second tilt compensation amount used to compensate the tilt in the second WDM signal, using the optical power value and the first calculation expression A2. The second calculation unit 43 calculates the first power compensation amount, using the optical power value and the second calculation expression B1. The second calculation unit 43 calculates the second power compensation amount, using the optical power value and the second calculation expression B2.

A coefficient calculation unit 84 calculates a correction coefficient, based on the current compensation amount and the estimated compensation amount (step S36). For example, the first coefficient calculation unit 84A calculates the first correction coefficient K used to correct the first calculation expression A1, based on the first tilt estimated compensation amount calculated by the first estimation calculation unit 83A and the current first tilt compensation amount calculated by the first calculation unit 42. The first coefficient calculation unit 84A calculates a first correction coefficient L used to correct the first calculation expression A2, based on the second tilt estimated compensation amount calculated by the first estimation calculation unit 83A and the current second tilt compensation amount calculated by the first calculation unit 42. A second coefficient calculation unit 84B calculates a second correction coefficient M used to correct the second calculation expression B1, based on the first power estimated compensation amount calculated by the second estimation calculation unit 83B and the current first power compensation amount calculated by the second calculation unit 43. The second coefficient calculation unit 84B calculates a second correction coefficient N used to correct the second calculation expression B2, based on the second power estimated compensation amount calculated by the second estimation calculation unit 83B and the current second power compensation amount calculated by the second calculation unit 43.

An update unit 85 updates the calculated correction coefficient in a second coefficient table 412 (step S37) and ends the processing operation illustrated in FIG. 10. For example, the first update unit 85A updates the first correction coefficient in the second coefficient table 412 with the first correction coefficients K and L calculated by the first coefficient calculation unit 84A. The second update unit 85B updates the second correction coefficient in the second coefficient table 412 with the second correction coefficients M and N calculated by the second coefficient calculation unit 84B.

The WDM device 2A1 according to the second embodiment acquires the first power profile that is first transmission line characteristics for each transmission distance in the first wavelength band and acquires the second power profile that is second transmission line characteristics for each transmission distance in the second wavelength band. The WDM device 2A1 calculates the first power change amount of the transmission line from the first power profile and calculates the second power change amount of the transmission line from the second power profile. Moreover, the WDM device 2A1 calculates the generated tilt amount of the transmission line, based on the first power change amount and the second power change amount. As a result, for example, at the time of system construction or system operation, a compensation amount suitable for each transmission line can be determined using the power profiles of the plurality of wavelength bands.

The WDM device 2A1 calculates the first power change amount of the transmission line, based on the first power profile and the first estimated power profile obtained by extrapolating with the inclination near the transmission line input end of the first power profile. The WDM device 2A1 calculates the second power change amount of the transmission line, based on the second power profile and the second estimated power profile obtained by extrapolating with the inclination near the transmission line input end of the second power profile. As a result, the first power change amount and the second power change amount can be acquired.

Note that, a case has been described where the acquisition unit 81 of the WDM device 2A1 calculates the generated tilt amount of the transmission line using the power profiles for each transmission distance in the first wavelength band and the second wavelength band, among the plurality of wavelength bands for each transmission distance of the transmission line. However, the number of wavelength bands is not limited to two, and three or more wavelength bands may be used. The number of wavelength bands can be appropriately changed.

Furthermore, in the first embodiment described above, a case has been described where the power profile indicating the optical power value for each transmission distance in any wavelength band, among the plurality of wavelength bands for each transmission distance of the transmission line is acquired. However, the acquisition unit 81 may acquire characteristics for each number of wavelengths, and an embodiment thereof will be described below as a third embodiment.

Third Embodiment

Figure 11A:
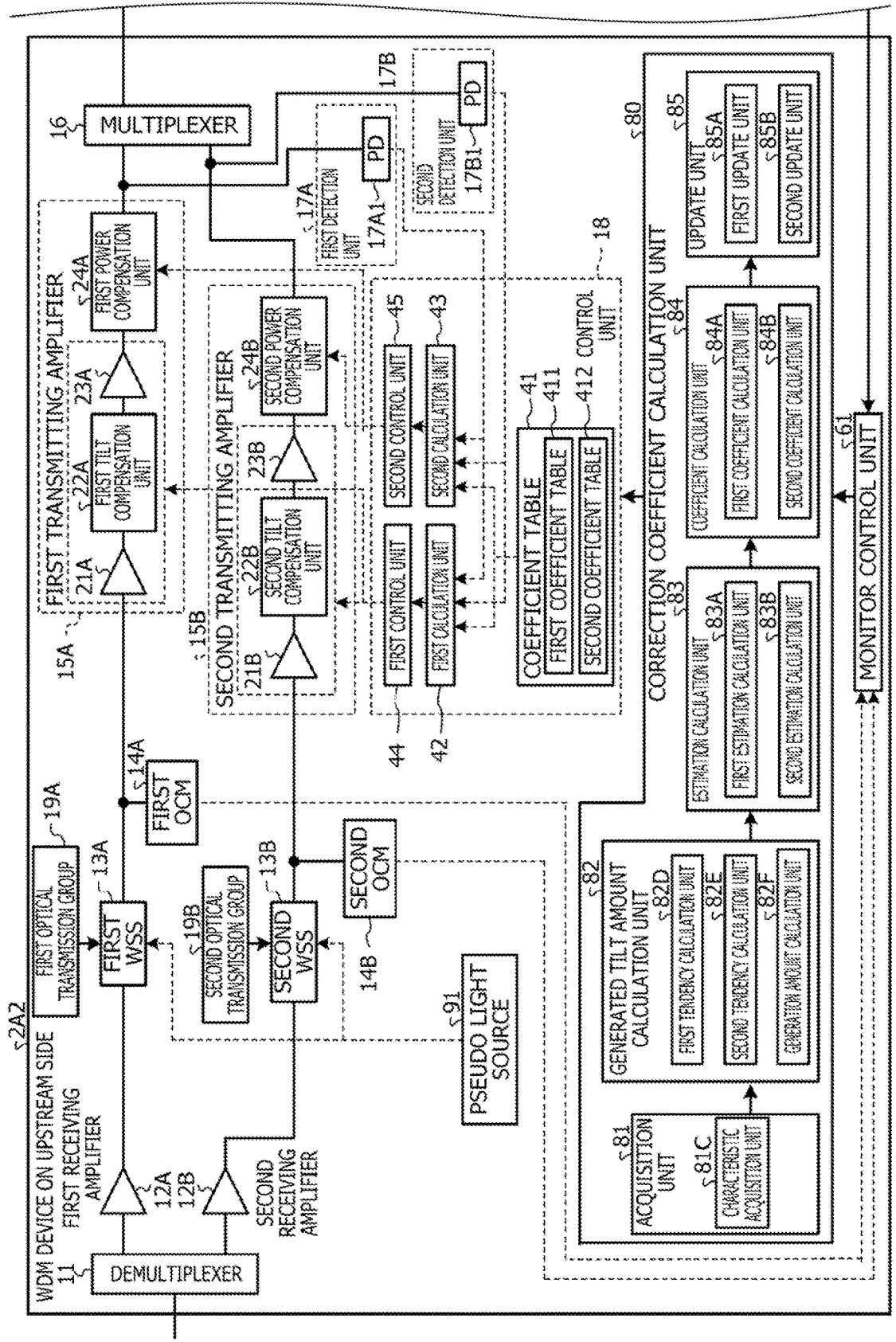

FIGS. 11A and 11B are an explanatory diagram illustrating an example of a WDM system 1B according to a third embodiment. Note that description of overlapping configurations and operations is omitted by providing the same reference numerals to the same configurations as those of the WDM system 1 illustrated in FIGS. 1A and 1B. A difference between the WDM device 2 illustrated in FIGS. 1A and 1B and a WDM device 2A2 illustrated in FIGS. 11A and 11B is a point that a pseudo light source 91 and a characteristic acquisition unit 81C are included. Moreover, a generated tilt amount calculation unit 82 includes a first tendency calculation unit 82D, a second tendency calculation unit 82E, and a generation amount calculation unit 82F. Note that a WDM device 2B2 has the substantially same configuration as the WDM device 2A2.

The pseudo light source 91 generates pseudo signals with a plurality of wavelength patterns in a transmission line. The pseudo light source 91 connects to a first WSS 13A and a second WSS 13B, inserts the pseudo signal from the first WSS 13A into a first WDM signal, and inserts the pseudo signal from the second WSS 13B into a second WDM signal.

A first OCM 14A in the WDM device 2B2 on the downstream side monitors optical power for each wavelength of the pseudo signal in the first WDM signal from the first WSS 13A on the downstream side and notifies a monitor control unit 61 of the monitoring result. Moreover, a second OCM 14B in the WDM device 2B on the downstream side monitors optical power for each wavelength of the pseudo signal in the second WDM signal from the second WSS 13B on the downstream side and notifies the monitor control unit 61 on the downstream side of the monitoring result. The monitor control unit 61 in the WDM device 2B on the downstream side notifies the monitor control unit 61 in the WDM device 2A on the upstream side of the optical power for each wavelength of the pseudo signal on the downstream side and the optical power for each wavelength of the pseudo signal on the downstream side.

An acquisition unit 81 includes the characteristic acquisition unit 81C. The characteristic acquisition unit 81C acquires transmission line characteristics indicating an optical power value of each wavelength for each wavelength pattern of the pseudo signal from the monitor control unit 61 at the time of system construction or stable system operation.

Figure 12:
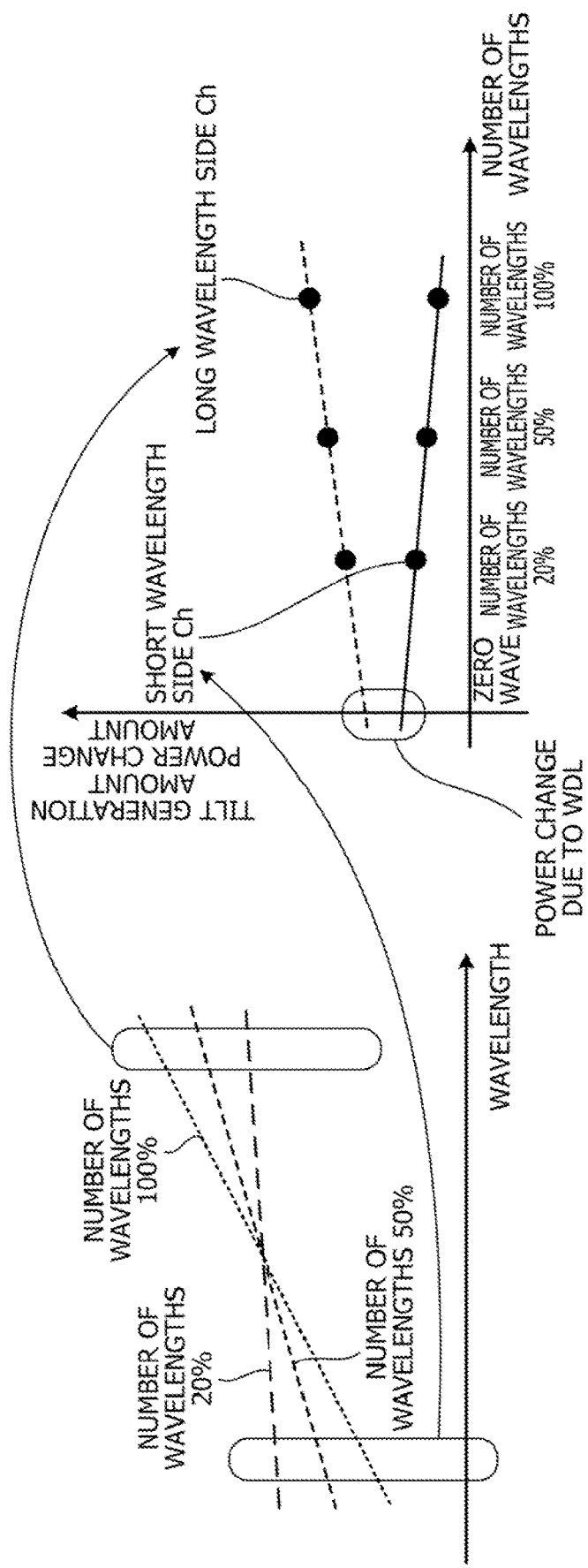
FIG. 12 is an explanatory diagram illustrating an example of power change tendencies of a long wavelength band and a short wavelength band according to the third embodiment.

FIG. 12 is an explanatory diagram illustrating an example of power change tendencies of a long wavelength band and a short wavelength band according to the third embodiment. The generated tilt amount calculation unit 82 includes the first tendency calculation unit 82D, the second tendency calculation unit 82E, and the generation amount calculation unit 82F. The first tendency calculation unit 82D calculates a first change tendency indicating an optical power value change tendency according to the number of wavelengths in any short wavelength side Ch from the transmission line characteristics for each wavelength pattern. As illustrated in FIG. 12, the first tendency calculation unit 82D calculates the first change tendency by plotting an optical power value in a case of the number of wavelengths of 20%, an optical power value in a case of the number of wavelengths of 50%, and an optical power value in a case of the number of wavelengths of 100% and extrapolates the first change tendency so as to obtain an optical power value of the number of wavelengths of zero %.

Furthermore, the second tendency calculation unit 82E calculates a second change tendency indicating an optical power value change tendency according to the number of wavelengths in any long wavelength side Ch from the transmission line characteristics for each wavelength pattern. As illustrated in FIG. 12, the second tendency calculation unit 82E calculates the second change tendency by plotting an optical power value in a case of the number of wavelengths of 20%, an optical power value in a case of the number of wavelengths of 50%, and an optical power value in a case of the number of wavelengths of 100% and extrapolates the second change tendency so as to obtain an optical power value of the number of wavelengths of zero %.

The generation amount calculation unit 82F calculates a generated tilt amount of the transmission line that is a power change amount for each number of wavelengths, based on the first change tendency and the second change tendency. The generation amount calculation unit 82F calculates a power change amount due to a WDL that is a difference between the optical power value of the number of wavelengths of zero % of the first change tendency and the optical power value of the number of wavelengths of zero % of the second change tendency. Moreover, as illustrated in FIG. 12, the generation amount calculation unit 82F calculates the generated tilt amount of the transmission line for each number of wavelengths, based on the power change amount for each number of wavelengths of the first change tendency and the second change tendency. The generation amount calculation unit 82F calculates, for example, a generated tilt amount of the number of wavelengths of 20%, a generated tilt amount of the number of wavelengths of 50%, and a generated tilt amount of the number of wavelengths of 100%.

Figure 13:
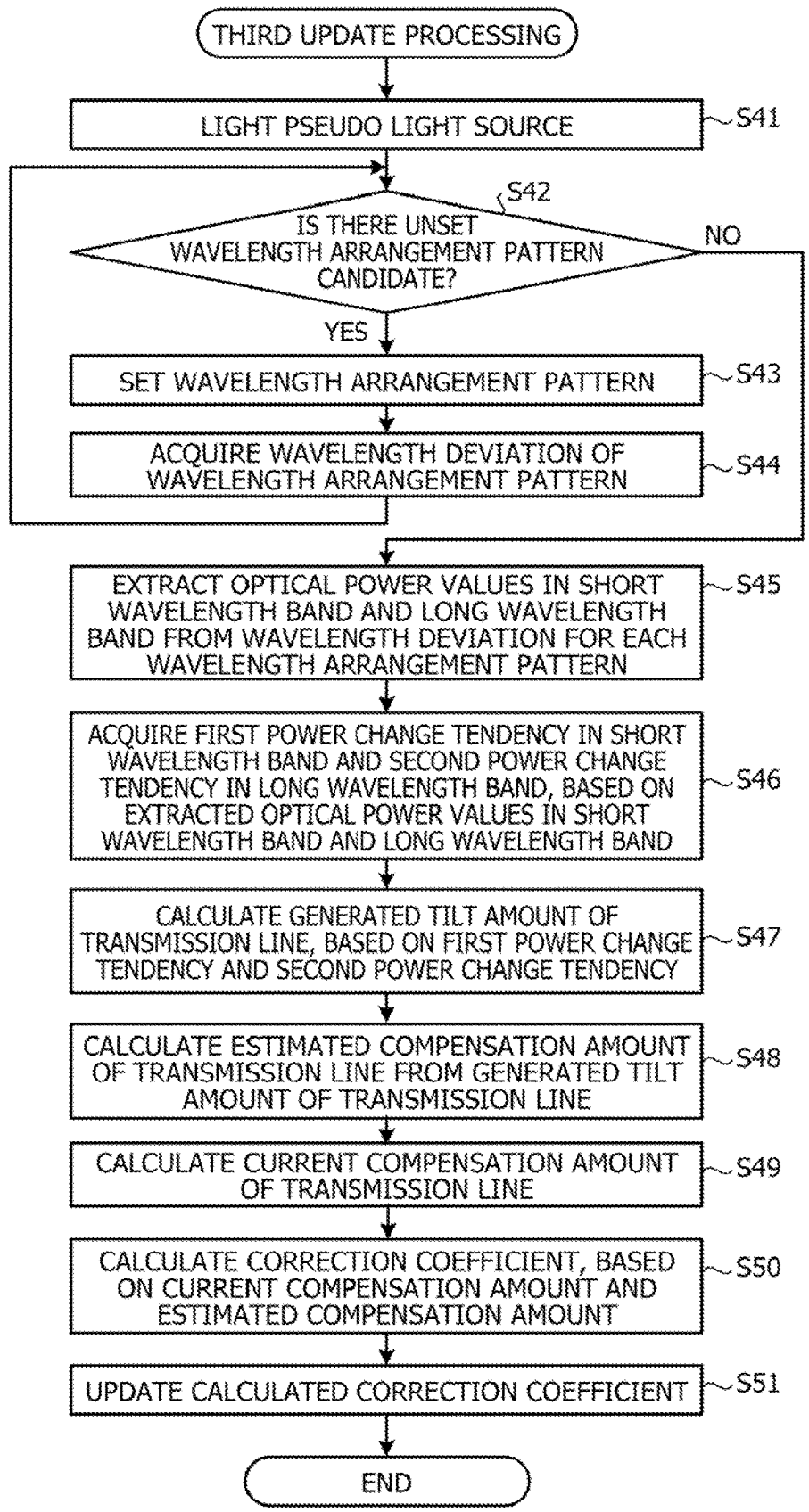
FIG. 13 is a flowchart illustrating an example of a processing operation of a correction coefficient calculation unit in a WDM device relating to third update processing.

FIG. 13 is a flowchart illustrating an example of a processing operation of a correction coefficient calculation unit 80 in the WDM device 2 relating to third update processing. In FIG. 13, the pseudo light source 91 emits a pseudo signal (step S41). The characteristic acquisition unit 81C determines whether or not there is an unset wavelength arrangement pattern candidate (step S42).

In a case where there is an unset wavelength arrangement pattern candidate (step S42: Yes), the characteristic acquisition unit 81C sets an unset wavelength arrangement pattern (step S43). The characteristic acquisition unit 81C acquires a wavelength deviation of the wavelength arrangement pattern (step S44) and proceeds to step S42 so as to determine whether or not there is an unset wavelength arrangement pattern candidate.

In a case where there is no unset wavelength arrangement pattern candidate (step S42: No), the characteristic acquisition unit 81C extracts optical power values in a short wavelength band and a long wavelength band from the wavelength deviation for each wavelength arrangement pattern (step S45).

The generated tilt amount calculation unit 82 acquires a first power change tendency in the short wavelength band and a second power change tendency in the long wavelength band, based on the optical power values in the short wavelength band and the long wavelength band (step S46). For example, the first tendency calculation unit 82D acquires the first power change tendency in the short wavelength band, based on the optical power value in the short wavelength band. The second tendency calculation unit 82E acquires the second power change tendency in the long wavelength band, based on the optical power value in the long wavelength band.

The generation amount calculation unit 82F in the generated tilt amount calculation unit 82 calculates the generated tilt amount of the transmission line according to the number of wavelengths, based on the first power change tendency in the short wavelength band and the second power change tendency in the long wavelength band (step S47).

An estimation calculation unit 83 calculates an estimated compensation amount of the transmission line, based on a generated tilt amount of the transmission line according to the current number of wavelengths (step S48). Note that the estimated compensation amount is, for example, the first tilt estimated compensation amount, the second tilt estimated compensation amount, the first power estimated compensation amount, and the second power estimated compensation amount. For example, a first estimation calculation unit 83A calculates the first tilt estimated compensation amount used to compensate a tilt in the first WDM signal, using the generated tilt amount of the transmission line calculated by the generated tilt amount calculation unit 82 and a first calculation expression A1. The first estimation calculation unit 83A calculates the second tilt estimated compensation amount used to compensate a tilt in the second WDM signal, using the generated tilt amount of the transmission line calculated by the generated tilt amount calculation unit 82 and a first calculation expression A2. A second estimation calculation unit 83B calculates the first power estimated compensation amount, using the generated tilt amount of the transmission line calculated by the generated tilt amount calculation unit 82 and a second calculation expression B1. The second estimation calculation unit 83B calculates the second power estimated compensation amount, using the generated tilt amount of the transmission line calculated by the generated tilt amount calculation unit 82 and a second calculation expression B2.

A control unit 18 calculates a current compensation amount of the transmission line (step S49). For example, the current compensation amount is, for example, the first tilt compensation amount, the second tilt compensation amount, the first power compensation amount, and the second power compensation amount. The first calculation unit 42 calculates the first tilt compensation amount used to compensate the tilt in the first WDM signal, using the optical power value and the first calculation expression A1. The first calculation unit 42 calculates the second tilt compensation amount used to compensate the tilt in the second WDM signal, using the optical power value and the first calculation expression A2. The second calculation unit 43 calculates the first power compensation amount, using the optical power value and the second calculation expression B1. The second calculation unit 43 calculates the second power compensation amount, using the optical power value and the second calculation expression B2.

A coefficient calculation unit 84 calculates a correction coefficient, based on the current compensation amount and the estimated compensation amount (step S50). For example, the first coefficient calculation unit 84A calculates a first correction coefficient K used to correct the first calculation expression A1, based on the first tilt estimated compensation amount calculated by the first estimation calculation unit 83A and the current first tilt compensation amount calculated by the first calculation unit 42. The first coefficient calculation unit 84A calculates a first correction coefficient L used to correct the first calculation expression A2, based on the second tilt estimated compensation amount calculated by the first estimation calculation unit 83A and the current second tilt compensation amount calculated by the first calculation unit 42. A second coefficient calculation unit 84B calculates a second correction coefficient M used to correct the second calculation expression B1, based on the first power estimated compensation amount calculated by the second estimation calculation unit 83B and the current first power compensation amount calculated by the second calculation unit 43. The second coefficient calculation unit 84B calculates a second correction coefficient N used to correct the second calculation expression B2, based on the second power estimated compensation amount calculated by the second estimation calculation unit 83B and the current second power compensation amount calculated by the second calculation unit 43.

An update unit 85 updates the calculated correction coefficient in a second coefficient table 412 (step S51) and ends the processing operation illustrated in FIG. 13. For example, the first update unit 85A updates the first correction coefficient in the second coefficient table 412 with the first correction coefficients K and L calculated by the first coefficient calculation unit 84A. The second update unit 85B updates the second correction coefficient in the second coefficient table 412 with the second correction coefficients M and N calculated by the second coefficient calculation unit 84B.

The WDM device 2A2 according to the third embodiment acquires the transmission line characteristics indicating the optical power value of each wavelength for each wavelength pattern from the pseudo signals with the plurality of wavelength patterns generated in the transmission line. The WDM device 2A2 calculates the first change tendency indicating the change tendency of the optical power value according to the number of wavelengths on any short wavelength side from the transmission line characteristics for each wavelength pattern and calculates the second change tendency indicating the change tendency of the optical power value according to the number of wavelengths on any long wavelength side. The WDM device 2A2 calculates the generated tilt amount of the transmission line, based on the first change tendency and the second change tendency. As a result, for example, at the time of system construction or system operation, the compensation amount suitable for each transmission line can be determined using the transmission line characteristics indicating the optical power value of each wavelength for each wavelength pattern.

Note that a case has been described where the WDM device 2A2 according to the third embodiment acquires the transmission line characteristics for each wavelength pattern using the pseudo signal from the pseudo light source 91. However, the embodiment is not limited to the pseudo light source 91, and for example, a first optical transmission group 19A or a second optical transmission group 19B may be used as the pseudo light source 91, and the pseudo light source 91 can be appropriately changed.

Furthermore, the WDM device 2 sets a demultiplexer 11, a first and second receiving amplifiers 12A and 12B, the first and second WSSs 13A and 13B, a first and second transmitting amplifiers 15A and 15B, a multiplexer 16, a first and second detection units 17A and 17B, and the control unit 18 as one package. An optical connector is connected to an input stage of the demultiplexer 11, and an optical connector is connected to an output stage of the multiplexer 16. Note that the WDM device 2 is similarly also described as a form of one package.

However, the WDM device 2 may include, for example, three packages, not a single package. A first package includes, for example, the first receiving amplifier 12A, the first WSS 13A, and the first transmitting amplifier 15A. A second package includes, for example, the second receiving amplifier 12B, the second WSS 13B, and the second transmitting amplifier 15B. A third package includes the demultiplexer 11, the multiplexer 16, the first and second detection units 17A and 17B, and the control unit 18.

The first receiving amplifier 12A in the first package is connected to the demultiplexer 11 in the third package with the optical connector, and the second receiving amplifier 12B in the second package is connected to the demultiplexer 11 in the third package with the optical connector. Moreover, the first transmitting amplifier 15A in the first package is connected to the multiplexer 16 in the third package with the optical connector, and the second transmitting amplifier 15B in the second package is connected to the multiplexer 16 in the third package with the optical connector. An input stage of the demultiplexer 11 in the third package is connected with the optical connector, and an output stage of the multiplexer 16 is connected with the optical connector. Moreover, the control unit 18 in the third package is connected to the first transmitting amplifier 15A in the first package with an electric connector, and the control unit 18 in the third package is connected to the second transmitting amplifier 15B in the second package with an electric connector.

For convenience of explanation, a case has been described where the WDM device 2 outputs a WDM signal obtained by multiplexing the first WDM signal in the C band and the second WDM signal in the L band. However, for example, it is also applicable in a case where a WDM signal obtained by multiplexing a second WDM signal in a S band with a short wavelength of 1460 nm to 1530 nm and the first WDM signal in the C band is output. Note that the first WDM signal is not limited to be in the C band and may be in the L band, the S band, or the like, and the second WDM signal is not limited to the L band and may be in the C band, the S band, or the like. The bands can be appropriately changed. Although the WDM signal including two optical wavelength bands has been described, the WDM device 2 can be applied to, for example, a case of a WDM signal including three or more optical wavelength bands.

In the present embodiment, a case has been described where the first coefficient table 411 that manages the coefficient 411B and the loss coefficient 411C for each fiber type 411A is included. However, there may be a case where the coefficient 411B and the loss coefficient 411C are input to the control unit 18 for each fiber type 411A or the control unit 18 may measure the fiber type of the optical fiber 3 and set the coefficient and the loss coefficient according to the measurement result, and it can be appropriately changed.

The C band, S band, and L band wavelength ranges have been defined in the above embodiments, but the embodiments are not limited to these wavelength ranges and the ranges can be appropriately set and changed.

Moreover, in the above embodiments, a case where the C band and the L band are used has been described. However, the embodiment is not limited to the C band, the S band, and the L band. For example, the embodiment may be applied to an original (O) band (1260 nm to 1360 nm), an extended (E)

band (1360 nm to 1460 nm), or an ultralong wavelength (U) band (1625 nm to 1675 nm), and the wavelength band can be appropriately changed.

Furthermore, for example, a case has been described where the WDM device 2 includes the first optical transmission group 19A and the second optical transmission group 19B therein. However, it is applicable to a case where the WDM device 2 is externally connected to the first optical transmission group and the second optical transmission group.

Furthermore, each of the components of each of the units illustrated in the drawings does not necessarily need to be physically configured as illustrated in the drawings. For example, specific forms of separation and integration of each of the units are not limited to the illustrated forms, and all or some of the units may be functionally or physically separated and integrated in any unit according to various loads, use situations, and the like.

Moreover, all or any part of various processing functions executed in each of the devices may be executed by a central processing unit (CPU) (or a microcomputer such as a micro processing unit (MPU) and a micro controller unit (MCU)). Furthermore, all or some of the various processing functions may of course be executed by a program analyzed and executed by a CPU (or a microcomputer such as an MPU and an MCU) or hardware using wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical wavelength multiplexing transmission device comprising:
    a demultiplexer configured to demultiplex a wavelength multiplexing signal for each wavelength band from a multiplexed signal that includes wavelength multiplexing signals in a plurality of the wavelength bands;
    a processor configured to detect an optical power value of each wavelength multiplexing signal for each wavelength band;
    calculate a compensation amount used to compensate a tilt of the wavelength multiplexing signal, by using the optical power value and a predetermined calculation expression; and
    compensate the tilt of the wavelength multiplexing signal, based on the compensation amount; and
    a multiplexer configured to multiplex each wavelength multiplexing signal compensated by the processor and output the wavelength multiplexing signal to a transmission line,
    wherein the processor is further configured to:
    acquire transmission line characteristics that indicates an optical power value in each wavelength band for each transmission distance of the transmission line;
    calculate a generated tilt amount of the transmission line, based on the transmission line characteristics;
    calculate an estimated compensation amount used to compensate the tilt of the wavelength multiplexing signal, by using the generated tilt amount of the transmission line and the predetermined calculation expression;
    calculate a correction coefficient used to correct the predetermined calculation expression, based on the estimated compensation amount and a current compensation amount; and
    update the correction coefficient.

2. The optical wavelength multiplexing transmission device according to claim 1, wherein
    the processor:
    calculates a first compensation amount used to compensate the tilt in the wavelength multiplexing signal, using the optical power value and a first calculation expression in the predetermined calculation expression,
    compensates the tilt in the wavelength multiplexing signal, based on the first compensation amount,
    calculates a first estimated compensation amount used to compensate the tilt in the wavelength multiplexing signal, using the generated tilt amount of the transmission line and the first calculation expression,
    calculates a first correction coefficient used to correct the first calculation expression, based on the first estimated compensation amount and a current first compensation amount, and
    updates the first correction coefficient.

3. The optical wavelength multiplexing transmission device according to claim 1, wherein
    the processor:
    calculates a second compensation amount used to compensate power for each wavelength band so as to reduce a power difference between the wavelength multiplexing signals, by using the optical power value and a second calculation expression in the predetermined calculation expression,
    compensates the power for each wavelength band, based on the second compensation amount,
    calculates a second estimated compensation amount used to compensate the power for each wavelength band, by using the generated tilt amount of the transmission line and the second calculation expression,
    calculates a second correction coefficient used to correct the second calculation expression, based on the second estimated compensation amount and a current second compensation amount, and
    updates the second correction coefficient.

4. The optical wavelength multiplexing transmission device according to claim 1, wherein
    the processor:
    acquires the transmission line characteristics that indicate an optical power value for each transmission distance in any wavelength band, among the plurality of wavelength bands for each transmission distance of the transmission line, and
    calculates a generated tilt amount for each transmission distance from the transmission line characteristics in the any wavelength band and calculates a generated tilt amount of the transmission line from the generated tilt amount for each transmission distance.

5. The optical wavelength multiplexing transmission device according to claim 1, wherein
    the processor:
    acquires first transmission line characteristics that indicates an optical power value for each transmission distance in a first wavelength band, among the plurality of wavelength bands for each transmission distance of the transmission line, acquires second transmission line characteristics that indicate an optical power value for each transmission distance in a second wavelength band, among the plurality of wavelength bands for each transmission distance of the transmission line, calculates a first power change amount of the transmission line from the first transmission line characteristics, calculates a second power change amount of the transmission line from the second transmission line characteristics, and calculates the generated tilt amount of the transmission line, based on the first power change amount and the second power change amount.

6. The optical wavelength multiplexing transmission device according to claim 5, wherein the processor:

calculates the first power change amount of the transmission line, based on the first transmission line characteristics and first estimated transmission line characteristics obtained by extrapolating an inclination near an input end of the transmission line of the first transmission line characteristics, and calculates the second power change amount of the transmission line, based on the second transmission line characteristics and second estimated transmission line characteristics obtained by extrapolating an inclination near an input end of the transmission line of the second transmission line characteristics.

7. The optical wavelength multiplexing transmission device according to claim 1, wherein the processor:

generates pseudo signals with a plurality of wavelength patterns in the transmission line, acquires transmission line characteristics that indicates an optical power value for each wavelength for each wavelength pattern from the pseudo signal, calculates a first change tendency that indicates a change tendency of an optical power value according to the number of wavelengths on any short wavelength side from the transmission line characteristics for each wavelength pattern, calculates a second change tendency that indicates a change tendency of an optical power value according to the number of wavelengths on any long wavelength side from the transmission line characteristics for each wavelength pattern, and calculates the generated tilt amount of the transmission line, based on the first change tendency and the second change tendency.

8. An optical wavelength multiplexing transmission method comprising:

demultiplexing a wavelength multiplexing signal for each wavelength band from a multiplexed signal that includes wavelength multiplexing signals in a plurality of the wavelength bands;

detecting an optical power value of each wavelength multiplexing signal for each wavelength band;

calculating a compensation amount used to compensate a tilt of the wavelength multiplexing signal, by using the optical power value and a predetermined calculation expression;

compensating the tilt of the wavelength multiplexing signal, based on the compensation amount;

a multiplexer configured to multiplex each wavelength multiplexing signal compensated by the control unit and output the wavelength multiplexing signal to a transmission line;

acquiring transmission line characteristics that indicates an optical power value in each wavelength band for each transmission distance of the transmission line;

calculate a generated tilt amount of the transmission line, based on the transmission line characteristics;

calculating an estimated compensation amount used to compensate the tilt of the wavelength multiplexing signal, by using the generated tilt amount of the transmission line and the predetermined calculation expression;

calculating a correction coefficient used to correct the predetermined calculation expression, based on the estimated compensation amount and a current compensation amount; and updating the correction coefficient.

* * * * *